United States Patent
Itoh et al.

(10) Patent No.: US 12,478,763 B2
(45) Date of Patent: Nov. 25, 2025

(54) EMBOLIC AGENT KIT

(71) Applicant: TERUMO KABUSHIKI KAISHA, Tokyo (JP)

(72) Inventors: Yuki Itoh, Hadano (JP); Eri Ikuno, Kaisei-machi (JP); Hideaki Shibata, Hadano (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 671 days.

(21) Appl. No.: 17/956,464

(22) Filed: Sep. 29, 2022

(65) Prior Publication Data

US 2023/0015474 A1 Jan. 19, 2023

Related U.S. Application Data

(63) Continuation of application No. PCT/JP2021/008414, filed on Mar. 4, 2021.

(30) Foreign Application Priority Data

Mar. 31, 2020 (JP) ................. 2020-062464

(51) Int. Cl.
*A61M 25/00* (2006.01)
*A61L 31/14* (2006.01)
*A61L 31/16* (2006.01)
*A61L 31/18* (2006.01)

(52) U.S. Cl.
CPC ....... *A61M 25/0043* (2013.01); *A61L 31/145* (2013.01); *A61L 31/16* (2013.01); *A61L 31/18* (2013.01); *A61L 2430/36* (2013.01); *A61M 2025/0057* (2013.01)

(58) Field of Classification Search
None
See application file for complete search history.

(56) References Cited

U.S. PATENT DOCUMENTS

| 6,159,165 | A | 12/2000 | Ferrera et al. |
| 6,303,100 | B1 | 10/2001 | Ricci et al. |
| 2019/0201592 | A1 | 7/2019 | Takahashi et al. |

FOREIGN PATENT DOCUMENTS

| JP | 2001-525217 A | 11/2001 |
| JP | 2002-539853 A | 11/2002 |
| JP | 2011-507637 A | 3/2011 |
| JP | 2013-505791 A | 2/2013 |
| JP | 2013-198668 A | 10/2013 |
| JP | 2014-221432 A | 11/2014 |
| JP | 2015-181673 A | 10/2015 |

(Continued)

OTHER PUBLICATIONS

International Search Report for International Application No. PCT/JP2021/008414, mailed Apr. 27, 2021.

(Continued)

*Primary Examiner* — Manuel A Mendez
(74) *Attorney, Agent, or Firm* — Sheridan Ross P.C.

(57) ABSTRACT

The present disclosure provides a technique capable of ensuring good visibility when introducing an embolic agent and reducing the visibility after introduction. Provided is an embolic agent kit. The embolic agent kit includes: a catheter having an inner cavity; a reaction product of an ethylenically unsaturated monomer and a crosslinking agent, which is filled in the inner cavity; and a priming solution containing a visualization agent and configured to prime an inside of the catheter.

20 Claims, 9 Drawing Sheets

(56) References Cited

FOREIGN PATENT DOCUMENTS

| WO | WO 00/56370 | 9/2000 |
| WO | WO 2009/086208 A2 | 7/2009 |
| WO | WO 2011/038291 A1 | 3/2011 |

OTHER PUBLICATIONS

Written Opinion for International Application No. PCT/JP2021/008414, mailed Apr. 27, 2021.
International Preliminary Report on Patentability for International Application No. PCT/JP2021/008414, mailed Oct. 13, 2022.

EMBOLIC AGENT KIT

CROSS REFERENCE TO RELATED APPLICATIONS

The present disclosure is a continuation of and claims benefit to PCT/JP2021/008414 filed on Mar. 4, 2021, entitled "EMBOLIZATION AGENT KIT" which claims priority to Japanese Patent Application No. 2020-062464 filed on Mar. 31, 2020. The entire disclosure of the applications listed above are hereby incorporated herein by reference, in their entirety, for all that they teach and for all purposes.

BACKGROUND

The present disclosure relates to an embolic agent kit and a treatment system using the embolic agent kit.

In the related art, for treating an aortic disease (aortic aneurysm, aortic dissociation, or the like), artificial blood vessel replacement surgery for replacing a blood vessel of an affected part with an artificial blood vessel has been performed. However, since this surgical method involves chest opening and abdominal opening, there is a problem that the burden (invasiveness) on a patient is large and hospitalization is prolonged. In consideration of such a problem, in recent years, a treatment using a stent graft (stent graft interpolation) has been widely used instead of the artificial blood vessel replacement surgery. In this surgical method, a stent graft is accommodated in a thin catheter and advanced to a site where there is an aneurysm, and the accommodated stent graft is released and expanded from the catheter and indwelled in a site where there is an aneurysm or dissociation (affected part). This stent graft interpolation is a minimally invasive treatment, and has an advantage that the progress of the patient after surgery is good. On the other hand, in the stent graft interpolation, a blood leakage (endoleak) may occur. There are four types of endoleaks, Type I to Type IV, depending on how the blood leaks into an aneurysm. Among these, the endoleak Type II is a type in which the blood flows back into the aneurysm from an inferior mesenteric artery, a lumbar artery (branch blood vessel), or the like due to a decrease in pressure in the aneurysm, and may cause a symptom such as expansion of the aneurysm. For such an endoleak Type II, there is known a method of introducing a biocompatible fluid composition as an embolic substance into a blood vessel causing an endoleak through a catheter and forming an embolus in the causative blood vessel before performing stent graft interpolation (JP-T-2002-539853 (corresponding to U.S. Pat. No. 6,303,100 B1)).

However, there are a plurality of blood vessels that cause an endoleak, and it is difficult to embolize all of the blood vessels. In addition, the biocompatible fluid composition described in Japanese Patent Publication No. 2002-539853 (e.g., corresponding to U.S. Pat. No. 6,303,100 B1) contains a contrast agent such that the embolus forming process can be visually recognized. However, there is a problem that, after indwelling, the contrasting property becomes an obstacle to impair visibility by a contrast agent separately introduced for confirming a blood flow, and accurate image diagnosis is difficult or impossible.

SUMMARY

Accordingly, the present disclosure has been made in view of the above circumstances, and at least one object of the present disclosure is to provide a technique capable of ensuring good visibility when introducing an embolic agent and reducing visibility after introduction.

As described in greater detail herein, the above problems can be solved by separately priming with a visualization agent before using an embolic agent having a weak contrasting property.

That is, the above object is achieved by an embolic agent kit. The embolic agent kit includes: a catheter having an inner cavity; a reaction product of an ethylenically unsaturated monomer, a crosslinking agent, and, if necessary, a bifunctional macromer, which is filled in the inner cavity; and a priming solution containing a visualization agent and configured to prime an inside of the catheter.

DETAILED DESCRIPTION

Figure 1A:
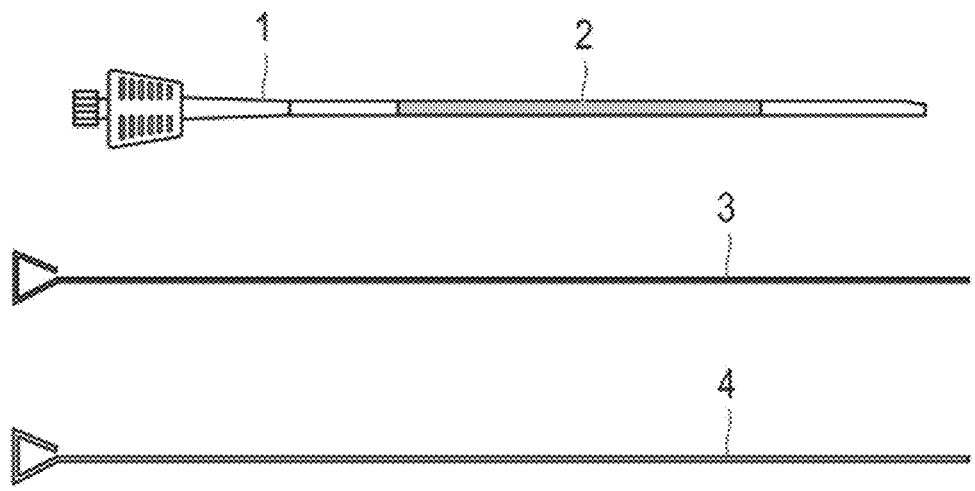
FIG. 1A is a diagram illustrating aspects of a method of using an embolic agent according to an embodiment of the present disclosure.

A first aspect of the present disclosure relates to an embolic agent kit. The embolic agent kit includes: a catheter having an inner cavity; a reaction product of an ethylenically unsaturated monomer and a crosslinking agent, which is filled in the inner cavity; and a priming solution containing a visualization agent and configured to prime an inside of the catheter. According to the embolic agent of the first aspect of the present disclosure, good visibility can be ensured when introducing the embolic agent, and after the introduction, the visibility can be reduced.

A second aspect of the present disclosure relates to an embolic agent kit. The embolic agent kit includes: a catheter having an inner cavity; a reaction product of a bifunctional macromer, an ethylenically unsaturated monomer, and a crosslinking agent, which is filled in the inner cavity; and a priming solution containing a visualization agent and configured to prime an inside of the catheter. According to the embolic agent of the second aspect of the present disclosure, good visibility can be ensured when introducing the embolic agent, and after the introduction, the visibility can be reduced.

That is, the first aspect and the second aspect of the present disclosure relates to an embolic agent kit. The embolic agent kit includes: a catheter having an inner cavity; a reaction product of an ethylenically unsaturated monomer, a crosslinking agent, and, if necessary, a bifunctional macromer, which is filled in the inner cavity; and a priming solution containing a visualization agent and configured to prime an inside of the catheter. In the description, the expression "reaction product of an ethylenically unsaturated monomer and a crosslinking agent" and the expression "reaction product of a bifunctional macromer, an ethylenically unsaturated monomer, and a crosslinking agent" are collectively and simply referred to as a "reaction product according to the present disclosure" or "reaction product". In addition, the expression "priming solution containing a visualization agent and configured to prime an inside of the catheter" is also simply referred to as a "priming solution". The reaction product after priming with the priming solution is also referred to as an "embolic agent" or a "prime reaction product".

According to the embolic agent kit of the present disclosure, when the embolic agent (prime reaction product) is introduced, the embolic agent can be satisfactorily visually recognized, and after the embolic agent is introduced into a predetermined site, the visibility of the embolic agent is reduced. Therefore, for example, when the embolic agent kit is introduced into an aneurysm, a position of the embolic agent can be satisfactorily confirmed until the embolic agent is indwelled in a predetermined site. On the other hand, after the embolic agent is indwelled in the predetermined site, the visibility of the embolic agent is reduced. Therefore, it is possible to clearly confirm the presence or absence of the inflow of a contrast agent into the aneurysm when the contrast agent is introduced through a branch blood vessel (e.g., an inferior mesenteric artery, or a lumbar artery, etc.) flowing into the aneurysm. Therefore, by using the embolic agent kit of the present disclosure, it is possible to effectively confirm the presence or absence of an endoleak, particularly an endoleak Type II. Here, a mechanism of exerting the above functions and effects by the configuration of the present disclosure is presumed as follows. The present disclosure is not limited to the following presumption. In the embolic agent kit of the present disclosure, a reaction product having a weak contrasting property and a priming solution containing a visualization agent are separately prepared. Usually, the embolic agent is accommodated in a catheter, and before use, physiological saline or the like is injected to remove air in a catheter inner cavity (priming). In the present disclosure, the inner cavity of the catheter, in which the reaction product is accommodated, is primed with the priming solution containing the visualization agent, and thus the air in the catheter inner cavity is removed and the contrasting property is imparted to the reaction product. Therefore, the prime reaction product (embolic agent, for example, hydrogel filament) after being primed with the priming solution containing the visualization agent contains a high-density visualization agent (the content of the visualization agent per unit volume in the embolic agent is high). Therefore, the position of the embolic agent can be satisfactorily confirmed by appropriate means such as X-rays until the embolic agent is indwelled in a predetermined site. On the other hand, after the embolic agent is indwelled in the predetermined site (e.g., an aneurysm), the visualization agent flows out and diffuses into a body fluid (e.g., blood), and the content (density) of the visualization agent per unit volume decreases. In addition, the reaction product according to the present disclosure swells due to contact with a body fluid (e.g., blood). Therefore, the content (density) of the visualization agent per unit volume after swelling is lower than the content (density) of the visualization agent per unit volume before swelling. Therefore, after the embolic agent is indwelled in the predetermined site, the visibility by appropriate means such as X-rays is greatly reduced. Therefore, the embolic agent hardly or does not interfere with the confirmation of the inflow of the contrast agent into the aneurysm through a blood vessel (e.g., an inferior mesenteric artery, or a lumbar artery) causing an endoleak. Therefore, by using the embolic agent of the present disclosure, it is possible to effectively confirm the presence or absence of an endoleak, particularly an endoleak Type II.

The embolic agent kit of the present disclosure is particularly effective when combined with stent graft interpolation. Therefore, a third aspect of the present disclosure relates to a treatment system including the embolic agent kit of the present disclosure and a graft (particularly, a stent graft).

Hereinafter, embodiments of the present disclosure will be described in detail. The present disclosure is not limited to the following embodiments. In addition, in the present description, "X to Y" indicating a range includes X and Y, and means "X or more and Y or less". In the present description, "X and/or Y" means including at least one of X and Y, and includes "X alone", "Y alone", and "a combination of X and Y". In addition, unless otherwise specified, operations, physical property measurements, and the like are performed under conditions of a room temperature (20° C. to 25° C.) and a relative humidity of 40% RH to 60% RH.

In the present description, the term "(meth)acrylic" includes both acrylic and methacrylic. Therefore, for example, the term "(meth)acrylic acid" includes both acrylic acid and methacrylic acid. Similarly, the term "(meth)acryloyl" includes both acryloyl and methacryloyl. Therefore, for example, the term "(meth)acryloyl group" includes both an acryloyl group and a methacryloyl group.

The embolic agent kit of the present disclosure includes: (1) a catheter having an inner cavity; (2) a reaction product of an ethylenically unsaturated monomer, a crosslinking agent, and, if necessary, a bifunctional macromer, which is filled in the catheter inner cavity of (1); and (3) a priming solution containing a visualization agent and configured to prime an inside of the catheter of (1). As described above, the embolic agent kit of the present disclosure separately includes the reaction product having a weak contrasting property and the priming solution containing the visualization agent. In one embodiment of the present disclosure, the reaction product does not include other members, for example, a support member (a metal support member). In particular, since the reaction product according to the present disclosure does not include a metal support member, halation (e.g., an artifact, flare, or reflection, etc.) derived from a metal does not occur when the embolic agent is observed by appropriate means such as X-rays, and thus the position of the embolic agent (prime reaction product) can be confirmed more clearly and accurately.

The reaction product according to the present disclosure may have any form. Examples thereof include a filament (fiber) shape, a particle shape, a sheet shape, and a strip shape. For example, the embolic agent can be formed into particles by appropriately cutting the reaction product having a fiber shape. By filling an elongated catheter with the obtained reaction product having a particle shape, a filled catheter to be described later can be obtained. In addition, by performing the reaction step in a thin mold rather than in a tube, a reaction product having a sheet shape or a strip shape can be obtained. The obtained reaction product having a sheet shape or a strip shape is rolled in a short axis direction and inserted into the elongated catheter, whereby the filled catheter to be described later can be obtained. Among these, a filament (fiber) shape may be beneficial from the viewpoint of easy indwelling in a predetermined site (e.g., an aneurysm, etc.), the swelling property after indwelling in a predetermined site (e.g., an aneurysm, etc.), a reduction in distal embolization risk, or the like. That is, in at least one embodiment of the present disclosure, the reaction product is in the form of a filament (e.g., fiber).

In addition, the embolic agent kit according to the present disclosure may contain other components as active components in addition to the priming solution and the reaction product according to the present disclosure. Here, as the other components, a drug (e.g., a blood coagulant) or the like can be used. In addition, when the embolic agent kit contains other components, the other components may be contained in the reaction product and/or the priming solution, or may be contained in a form different from the reaction product and the priming solution (e.g., in a form of a solution containing a drug). In addition, the content of the other components is, for example, more than 0 wt % and less than 10 wt % with respect to the total weight of the active components in the embolic agent kit (the total weight of the reaction product and the priming solution). In some embodiments, the active components in the embolic agent kit according to the present disclosure are substantially composed of the priming solution and the reaction product according to the present disclosure. Here, the expression "the active components in the embolic agent kit are substantially composed of the reaction product and the priming solution" means that the content of the reaction product and the priming solution in the active components (e.g., the reaction product, the priming solution, and the other components) of the embolic agent kit is 95 wt % or more, and, in some embodiments, 98 wt % or more (upper limit: 100 wt %). In at least one embodiment, the active components of the embolic agent kit according to the present disclosure are composed of the priming solution and the reaction product according to the present disclosure (the content of the other components in the embolic agent kit=0 wt %). In some embodiments, the active components of the embolic agent kit according to the present disclosure are composed of the priming solution and the reaction product having a fiber shape according to the present disclosure (the content of the other components in the embolic agent kit=0 wt %).

The reaction product according to the present disclosure swells due to contact with an aqueous liquid under a physiological condition. In the present description, the term "physiological condition" means a condition having at least one environmental characteristic in the body or body surface of a mammal (e.g., a human). Such a characteristic includes an isotonic environment, a pH buffering environment, an aqueous environment, a pH near neutral (about 7), a temperature, or a combination thereof. In addition, the term "aqueous liquid" includes, for example, an isotonic solution, water, and a body fluid of a mammal (e.g., a human) such as blood, a spinal fluid, plasma, serum, a glass body fluid, and urine.

The size of the reaction product according to the present disclosure is not particularly limited, and can be appropriately selected depending on a size of the aneurysm in which the reaction product is to be indwelled, the thickness of the branch blood vessel such as an inferior mesenteric artery or a lumbar artery connected to the aneurysm, or the like. For example, when the reaction product is fibrous, a diameter of the reaction product before swelling (in a dry state) is about 0.1 millimeter (mm) to 5 mm, and, in some cases, about 0.2 mm to 3 mm. In addition, a length of the reaction product before swelling (in a dry state) is about 0.5 centimeters (cm) to 200 cm, and, in some cases, about 10 cm to 60 cm. In the present description, the expression "before swelling (in a dry state)" means a state after the reaction product is dried under a reduced pressure for a sufficient time (e.g., 24 hours).

The reaction product is a reaction product of an ethylenically unsaturated monomer, a crosslinking agent, and, if necessary, a bifunctional macromer. That is, the reaction product is a reaction product of an ethylenically unsaturated monomer and a crosslinking agent (the first aspect) or a reaction product of a bifunctional macromer, an ethylenically unsaturated monomer and a crosslinking agent (the second aspect).

Here, the ethylenically unsaturated monomer is a monomer having a double bond at a terminal such as an acryloyl group ($CH_2$=CH—C(=O)—), a methacryloyl group ($CH_2$=C($CH_3$)—C(=O)—), a vinyl group ($CH_2$=CH—), an acrylamide group ($CH_2$=CH—C(=O)—NH—), or a methacrylamide group ($CH_2$=C($CH_3$)—C(=O)—NH—). Specific examples of the ethylenically unsaturated monomer include: (meth)acrylic acid, 2-(meth)acryloylethanesulfonic acid, 2-(meth)acryloylpropanesulfonic acid, 2-(meth)acrylamide-2-methylpropanesulfonic acid, vinylsulfonic acid, styrenesulfonic acid, and salts thereof (e.g., alkali metal salts, ammonium salts, and amine salts); (meth)acrylamide, N-substituted (meth)acrylamide, 2-hydroxyethyl (meth)acrylate, and 2-hydroxypropyl (meth)acrylate; N,N-dimethylaminoethyl (meth)acrylate, N,N-diethylaminoethyl (meth)acrylate, N,N-diethylaminopropyl (meth)acrylate, and derivatives thereof; N,N-dimethylaminopropyl (meth)acrylamide and quaternized products thereof; and N-vinylpyrrolidinone and derivatives thereof. The ethylenically unsaturated monomers may be used alone or in combination of two or more types thereof. From the viewpoint of higher swelling properties, biocompatibility, non-biodegradability, or the like when in contact with a body fluid, the ethylenically unsaturated monomer may be N-vinylpyrrolidinone, 2-hydroxyethyl acrylate, 2-hydroxyethyl methacrylate, and derivatives thereof, and acrylic acid, methacrylic acid, and salts thereof. That is, in a at least one embodiment of the present disclosure, the ethylenically unsaturated monomer is at least one selected from the group consisting of N-vinylpyrrolidinone, 2-hydroxyethyl acrylate, 2-hydroxyethyl methacrylate, derivatives thereof, acrylic acid, methacrylic acid, and salts thereof. In addition, from the viewpoint of further higher swelling properties, biocompatibility, non-biodegradability, or the like when in contact with a body fluid, the ethylenically unsaturated monomer may be (meth) acrylic acid or an alkali metal salt (sodium salt, lithium salt, or potassium salt) thereof, and may be acrylic acid and/or sodium acrylate.

In addition, the crosslinking agent is not particularly limited as long as the crosslinking agent can crosslink the ethylenically unsaturated monomer or the bifunctional macromer and the ethylenically unsaturated monomer, and a known crosslinking agent can be used. Specific examples of the crosslinking agent include N,N'-methylenebis(meth) acrylamide, (poly)ethylene glycol di(meth)acrylate, 2-hydroxy-3-acryloyloxypropyl (meth)acrylate, 1,10-decanediol di(meth)acrylate, 1,6-hexanediol di(meth)acrylate, 1,9-nonanediol di(meth)acrylate, (poly)propylene glycol di(meth)acrylate, (poly)tetramethylene glycol di(meth)acrylate, and derivatives thereof. These crosslinking agents may be used alone or in combination of two or more types thereof. From the viewpoint of easily controlling the swelling property, biocompatibility, non-biodegradability, or the like when in contact with a body fluid, the crosslinking agent may be N,N'-methylenebis(meth)acrylamide, ethylene glycol dimethacrylate, or derivatives thereof. That is, in at least one embodiment of the present disclosure, the crosslinking agent is at least one selected from the group consisting of N,N'-methylenebisacrylamide, ethylene glycol dimethacrylate, and derivatives thereof. In addition, from the viewpoint of easily controlling the swelling property, biocompatibility, non-biodegradability, or the like when in contact with a body fluid, the crosslinking agent may be N,N'-methylenebis (meth)acrylamide, and, in some cases, may be N,N'-methylenebisacrylamide.

The bifunctional macromer crosslinks the polymer chain during polymerization to impart softness (flexibility) to the reaction product (therefore, the embolic agent). Therefore, the reaction product (therefore, the embolic agent) containing the bifunctional macromer has excellent followability to a bent portion. Therefore, even when the embolic agent is to be indwelled in the aneurysm via the catheter, the embolic agent can easily pass through the bent portion and be indwelled in the aneurysm. Therefore, the reaction product according to the present disclosure may be a reaction product of a bifunctional macromer, an ethylenically unsaturated monomer, and a crosslinking agent.

The bifunctional macromer is not particularly limited as long as the bifunctional macromer contains two functional sites, and, in at least one embodiment, contains one or more ethylene-based unsaturated groups and two functional sites (a bifunctional ethylene-based unsaturated moldable macromer). Here, the one or more ethylene-based unsaturated groups may form one or both of the functional sites. Examples of the bifunctional macromer include, but are not limited to, polyethylene glycol, polypropylene glycol, poly (tetramethylene oxide), poly(ethylene glycol) diacrylamide, poly(ethylene glycol) dimethacrylamide, poly(ethylene glycol) diacrylate, poly(ethylene glycol) dimethacrylate, poly (propylene glycol) diacrylate, poly(propylene glycol) dimethacrylate, and derivatives thereof. Among these, from the viewpoint of the effect of imparting softness (flexibility) to the embolic agent, the bifunctional macromer may be polyethylene glycol, polypropylene glycol, poly(tetramethylene oxide), poly(ethylene glycol) diacrylamide, poly(ethylene glycol) dimethacrylamide, poly(ethylene glycol) diacrylate, poly(ethylene glycol) dimethacrylate, and derivatives thereof. Here, the bifunctional macromers may be used alone or in combination of two or more types thereof. That is, in at least one embodiment of the present disclosure, the bifunctional macromer is at least one selected from the group consisting of polyethylene glycol, polypropylene glycol, poly(tetramethylene oxide), poly(ethylene glycol) diacrylamide, poly(ethylene glycol) dimethacrylamide, poly (ethylene glycol) diacrylate, poly(ethylene glycol) dimethacrylate, and derivatives thereof. From the viewpoints of biocompatibility and solubility in a solvent, the bifunctional macromer may be poly(ethylene glycol) di(meth)acrylamide. From the viewpoint of decomposability, the bifunctional macromer may be poly(ethylene glycol) di(meth)acrylate.

The molecular weight of the bifunctional macromer is not particularly limited, and may be a low molecular weight (bifunctional low molecular weight ethylene-based unsaturated moldable macromer) from the viewpoint of the effect of imparting softness (flexibility) to the embolic agent, improving the swelling ratio, or the like. Specifically, the molecular weight of the bifunctional macromer may be about 100 grams per mole (g/mol) to about 50,000 g/mol, about 1,000 g/mol to about 20,000 g/mol, and, in some cases about 2,000 g/mol to about 15,000 g/mol.

The reaction product according to the present disclosure may contain a structural unit derived from other monomers (other structural units) in addition to the ethylenically unsaturated monomer, the crosslinking agent, and, if necessary, the bifunctional macromer. Here, the other monomers are not particularly limited as long as the other monomers do not inhibit the effects (swelling property, visibility before and after swelling, or the like) of the present disclosure. Specific examples of the monomer include 2,4,6-triiodophenylpenta-4-enoate and 5-(meth)acrylamide-2,4,6-triiodo-n, n'-bis-(2,3-dihydroxypropyl) isophthalamide N-vinylpyrrolidinone. When the reaction product according to the present disclosure has other structural units, the amount (content) of the other structural units is not particularly limited as long as the amount does not inhibit the effects (swelling property, visibility before and after swelling, or the like) of the present disclosure. Specifically, the amount (content) of the other structural units is less than 10 mol %, in some cases less than 5 mol %, and may even be less than 1 mol %, with respect to all structural units constituting the reaction product (lower limit value: more than 0 mol %). When the structural unit derived from other monomers is constituted by two or more types of structural units, a composition of the above structural unit derived from other monomers occupies a proportion (molar ratio (mol %)) of all the structural units derived from other monomers with respect to the total of all the structural units (100 mol %). The mol % is substantially equal to the proportion of the charged amount (mol) of other monomers with respect to the total charged amount (mol) of all the monomers in the production of the reaction product. In some embodiments, the reaction product does not contain other structural units (the amount (e.g., content) of other structural units is 0 mol %).

The amount (content) of each component in the reaction product is not particularly limited. From the viewpoint of the effect of increasing the swelling property and the mechanical strength, the amount of the ethylenically unsaturated monomer may be large. Specifically, for example, when the reaction product is a reaction product of an ethylenically unsaturated monomer and a crosslinking agent, the content of the ethylenically unsaturated monomer is more than 60 wt %, 80 wt % or more and less than 100 wt %, 90 wt % or more and less than 100 wt %, and/or 95 wt % or more and less than 100 wt %, with respect to the total weight of the reaction product. In addition, when the reaction product is a reaction product of a bifunctional macromer, an ethylenically unsaturated monomer, and a crosslinking agent, the content of the ethylenically unsaturated monomer may be more than 60 wt %, 63 wt % to 99 wt %, 64 wt % or more and less than 98 wt %, and/or 65 wt % to 97 wt %, with respect to the total weight of the reaction product. Within such a range, the obtained reaction product can exhibit a higher swelling ratio by contact with a body fluid (e.g., blood). That is, in at least one embodiment of the present disclosure, the reaction product of the ethylenically unsaturated monomer and the crosslinking agent contains the ethylenically unsaturated monomer in a proportion of more than 60 wt % with respect to the total weight of the ethylenically unsaturated monomer and the crosslinking agent. In at least one embodiment of the present disclosure, the reaction product of the ethylenically unsaturated monomer and the crosslinking agent contains the ethylenically unsaturated monomer in a proportion of 80 wt % or more and less than 100 wt % (in at least one embodiment, 90 wt % or more and less than 100 wt %, and, in some embodiments, 95 wt % or more and less than 100 wt %) with respect to the total weight of the ethylenically unsaturated monomer and the crosslinking agent. Alternatively, in at least one embodiment of the present disclosure, the reaction product of the bifunctional macromer, the ethylenically unsaturated monomer, and the crosslinking agent contains the ethylenically unsaturated monomer in a proportion of more than 60 wt %, with respect to the total weight of the bifunctional macromer, the ethylenically unsaturated monomer, and the crosslinking agent. In at least one embodiment of the present disclosure, the reaction product of the bifunctional macromer, the ethylenically unsaturated monomer, and the crosslinking agent contains the ethylenically unsaturated monomer in a proportion of 63 wt % to 99 wt % (and may be in a proportion of 64 wt % or more and less than 98 wt %, and, in some embodiments, may be in a proportion of 65 wt % to 97 wt %) with respect to the total weight of the bifunctional macromer, the ethylenically unsaturated monomer, and the crosslinking agent.

When the reaction product is a reaction product of an ethylenically unsaturated monomer and a crosslinking agent, the content of the crosslinking agent is less than 3 wt %, and may be 0.0001 wt % to 2 wt %, 0.0005 wt % or more and less than 1 wt %, and/or 0.001 wt % or more and less than 0.5 wt %, with respect to the total weight of the reaction product. In addition, when the reaction product is a reaction product of a bifunctional macromer, an ethylenically unsaturated monomer, and a crosslinking agent, the content of the crosslinking agent is less than 3 wt %, and may be 0.0001 wt % to 2 wt %, 0.0005 wt % or more and less than 1 wt %, and/or 0.001 wt % or more and less than 0.5 wt %, with respect to the total weight of the reaction product. Within such a range, the obtained reaction product can exhibit a higher swelling ratio by contact with a body fluid (e.g., blood).

When the reaction product is a reaction product of a bifunctional macromer, an ethylenically unsaturated monomer, and a crosslinking agent, the content of the bifunctional macromer is 40 wt % or less, and may be 1 wt % or more and less than 35 wt %, more than 2 wt % and less than 20 wt %, and/or 3 wt % to 15 wt %, with respect to the total weight of the reaction product. Within such a range, the obtained reaction product can exhibit more appropriate softness (e.g., flexibility).

In the first aspect, the contents of the ethylenically unsaturated monomer and the crosslinking agent are substantially equal to the proportion of the charged amount (weight) of the corresponding component to the total charged amount (weight) of all components (the ethylenically unsaturated monomer, the crosslinking agent, and other monomers when used) in the production of the reaction product. Similarly, in the second aspect, the contents of the bifunctional macromer, the ethylenically unsaturated monomer, and the crosslinking agent are substantially equal to the proportion of the charged amount (weight) of the corresponding component to the total charged amount (weight) of all components (the bifunctional macromer, the ethylenically unsaturated monomer, the crosslinking agent, and other monomers when used) in the production of the reaction product.

The production of the reaction product is not particularly limited, and known methods such as those described in Japanese Patent Publication No. 2011-507637 can be applied in the same manner or appropriately modified. Specifically, when the reaction product is a reaction product of an ethylenically unsaturated monomer and a crosslinking agent (first aspect), a method is provided (embodiment 1) in which an ethylenically unsaturated monomer, a crosslinking agent, a solvent, and a reaction initiator and/or a reaction accelerator are mixed (mixing step 1), and the mixture is reacted (polymerization step 1). In addition, when the reaction product is a reaction product of a bifunctional macromer, an ethylenically unsaturated monomer, and a crosslinking agent (second aspect), a method is provided (embodiment 2) in which a bifunctional macromer, an ethylenically unsaturated monomer, a crosslinking agent, a solvent, and a reaction initiator and/or a reaction accelerator are mixed (mixing step 2), and the mixture is reacted (polymerization step 2).

Hereinafter, these embodiments of the present disclosure will be described in greater detail. However, the present disclosure is not limited to the following embodiments.

In the mixing step 1 of embodiment 1, the ethylenically unsaturated monomer, the crosslinking agent, the solvent, and the reaction initiator and/or the reaction accelerator are mixed. Here, the types and addition amounts of the ethylenically unsaturated monomer and the crosslinking agent are not particularly limited, and are the same as those described above, and thus the description thereof is omitted here.

In addition, in the mixing step 2 of embodiment 2, the bifunctional macromer, the ethylenically unsaturated monomer, the crosslinking agent, the solvent, and the reaction initiator and/or the reaction accelerator are mixed. Here, the types and addition amounts of the bifunctional macromer, the ethylenically unsaturated monomer, and the crosslinking agent are not particularly limited, and are the same as those described above, and thus the description thereof is omitted here.

The solvent that can be used in the mixing steps 1 and 2 is not particularly limited as long as the solvent can promote the polymerization in the next step. Specific examples of the solvent include water, methanol, ethanol, isopropyl alcohol (e.g., IPA, isopropanol), dichloromethane, and acetone. These solvents may be used alone or in combination of two or more types thereof. The amount of the solvent to be used is not particularly limited, and from the viewpoint of uniformly mixing the components, the total concentration (solid content concentration) of the components may be 30 wt % to 70 wt %, and/or 35 wt % to 60 wt %.

The reaction initiator that can be used in the mixing steps 1 and 2 is not particularly limited as long as the polymerization reaction can be initiated in the next polymerization steps 1 and 2, and a known reaction initiator can be used. Specific examples of the reaction initiator include N,N,N', N'-tetramethylethylenediamine (TEMED). These reaction initiators may be used alone or in combination of two or more types thereof. The amount of the reaction initiator is not particularly limited as long as the polymerization reaction can be initiated in the next polymerization steps 1 and 2. Specifically, in the mixing step 1, the reaction initiator may be about $1.0 \times 10^{-3}$ mol to $3.0 \times 10^{-3}$ mol with respect to 1 mol of the ethylenically unsaturated monomer. In addition, in the mixing step 2, the reaction initiator may be about $1.0 \times 10^{-3}$ mol to $3.0 \times 10^{-3}$ mol with respect to 1 mol of the ethylenically unsaturated monomer.

The reaction accelerator that can be used in the mixing steps 1 and 2 is not particularly limited as long as the reaction accelerator can accelerate the polymerization reaction in the next polymerization steps 1 and 2, and a known reaction accelerator can be used. Specific examples of the reaction accelerator include ammonium persulfate (APS), sodium persulfate, benzoyl peroxide, azobisisobutyronitrile (AIBN), and water-soluble AIBN derivatives (e.g., 2,2'-azobis(2-methylpropionamidine) dihydrochloride). These reaction accelerators may be used alone or in combination of two or more types thereof. The amount of the reaction accelerator is not particularly limited as long as the polymerization reaction can be promoted in the next polymerization steps 1 and 2. Specifically, in the mixing step 1, the reaction accelerator may be about $1.0 \times 10^{-4}$ mol to $5.0 \times 10^{-4}$ mol with respect to 1 mol of the ethylenically unsaturated monomer. In addition, in the mixing step 2, the reaction accelerator may be about $1.0 \times 10^{-4}$ mol to $5.0 \times 10^{-4}$ mol with respect to 1 mol of the ethylenically unsaturated monomer.

At least one of the reaction initiator and the reaction accelerator may be mixed with the ethylenically unsaturated monomer, the crosslinking agent, or the like, and, in some cases, to mix both the reaction initiator and the reaction accelerator from the viewpoint of easily progressing the next polymerization step, a reaction time, or the like.

In the mixing steps 1 and 2, porosigen may be further added. By using the porosigen, pores can be formed in the embolic agent. Therefore, it is possible to enhance the contact with a body fluid and to make the swelling more quickly. Here, the porosigen is not particularly limited, and examples thereof include sodium chloride, ice, sucrose, and sodium bicarbonate. When the porosigen is further used, the addition amount of the porosigen can be appropriately adjusted according to the degree of formation of pores in the embolic agent. For example, the addition amount of the porosigen is about 1 time to 3 times the total charged amount (weight) of the ethylenically unsaturated monomer, the crosslinking agent, and other monomers when used (first aspect), or the total charged amount (weight) of the bifunctional macromer, the ethylenically unsaturated monomer, the crosslinking agent, and other monomers when used (second aspect).

Next, the mixture obtained in the mixing steps 1 and 2 is subjected to a reaction (polymerization or crosslinking reaction is performed) (polymerization steps 1 and 2). Accordingly, the reaction product (hydrogel filament) according to the present disclosure is obtained.

Here, the reaction conditions are not particularly limited as long as the ethylenically unsaturated monomer and the crosslinking agent are sufficiently reacted (polymerized/crosslinked) (polymerization step 1) or the bifunctional macromer, the ethylenically unsaturated monomer, and the crosslinking agent are sufficiently reacted (polymerization step 2), and can be appropriately selected depending on the type and amount of the ethylenically unsaturated monomer, the crosslinking agent, or the like to be used (polymerization step 1) or the bifunctional macromer, the ethylenically unsaturated monomer, the crosslinking agent, or the like to be used (polymerization step 2). Specifically, the reaction temperature may be about 10° C. to 60° C. In addition, the reaction time may be about 1 hour to 6 hours. Under such conditions, the reaction product (hydrogel filament) according to the present disclosure can be produced more efficiently.

In addition, the atmosphere in which the reaction is performed is not particularly limited, and the reaction may be performed in an air atmosphere, an inert gas atmosphere such as nitrogen gas or argon gas, or the like. In addition, the reaction may be performed while stirring the mixture.

In addition, it is an aspect of the present disclosure to inject the mixture into a tube to perform the reaction. Accordingly, a reaction product having a desired shape and size can be obtained. Alternatively, the reaction may be performed after the tube into which the mixture is injected is wrapped around a mandrel. Accordingly, it is possible to obtain a reaction product having a complicated shape such as a spiral shape or a swirl shape. Here, a material constituting the tube is not particularly limited, and may be a material that does not deform at the reaction temperature. Specifically, resins such as polyethylene, polypropylene, and thermoplastic polyether ester elastomer (e.g., HYTREL (registered trademark) manufactured by DU PONT-TORAY CO., LTD.) can be used. Since a diameter of the sample after polymerization is reduced by drying the sample in the tube, the sample can be easily taken out by extruding the sample with the mandrel or the like. HYTREL (registered trademark) is excellent in solvent solubility, and thus the reaction product can be easily taken out from the tube after polymerization.

After the reaction, if necessary, the reaction product may be washed to remove the unreacted ethylenically unsaturated monomer and crosslinking agent (embodiment 1) or the unreacted bifunctional macromer, ethylenically unsaturated monomer, and crosslinking agent (embodiment 2).

Instead of or in addition to the washing step, the reaction product may be incubated in a solution having a low or high pH. In particular, when the ethylenically unsaturated monomer has a carboxyl group (or a group derived from a carboxylate) such as (meth)acrylic acid or a salt thereof, the reaction product may be incubated in a solution having a low pH. Accordingly, free protons in the solution protonate the carboxyl group in a network of the reaction product. Since the reaction product does not swell until the carboxyl group is deprotonated, the swelling can be controlled. In addition, when the ethylenically unsaturated monomer has an amine group such as N,N-dimethylaminoethyl (meth)acrylate, the reaction product may be incubated in a solution having a high pH. Accordingly, the amine group is deprotonated. Since the reaction product does not swell until the amine group is protonated, the swelling can be controlled. Here, the incubation time, the temperature, and the pH of the solution are not particularly limited, and can be appropriately selected according to a desired degree of swelling (e.g., a swelling rate). In general, the incubation time and the temperature are directly proportional to the degree of swelling control, and inversely proportional to the solution pH. In addition, the incubation may be performed in a sufficient amount of solution. Accordingly, the reaction product can further swell in the solution. In addition, since a larger number of carboxyl groups can be used for protonation or a larger number of amine groups can be used for deprotonation, the swelling rate can be controlled to a more desired degree. After completion of the incubation, the excess solution is washed and removed, and dehydrated. The reaction product treated with the solution having a low pH can be dehydrated to a smaller size than that of the untreated reaction product. Therefore, in this step, the reaction product can be delivered to a desired site via a catheter having a smaller diameter, so that the invasiveness to the patient can be further prevented.

After the reaction step and/or the washing step and/or the incubation step, the reaction product is dehydrated. Accordingly, the reaction product (dehydrated state) according to the present disclosure is obtained. The reaction product (dehydrated state) is filled in a catheter (introducer sheath). In addition, the catheter filled with the reaction product (dehydrated state) may be packaged and sterilized into a product form.

The priming solution contains a visualization agent and a solvent.

Here, the visualization agent is not particularly limited, and may be appropriately selected according to a confirmation method such as X-rays, fluorescent X-rays, ultrasound, a fluorescence method, infrared rays, or ultraviolet rays.

The rate of decrease in visibility can be controlled by the type of the visualization agent. Specifically, when a constituent element derived from the ethylenically unsaturated monomer contained in the reaction product is ionized in the priming solution to generate cations or anions, the visualization agent forms, in the priming solution, ions (e.g., anions or cations) opposite to the ions generated by the constituent element derived from the ethylenically unsaturated monomer. In such an embodiment, when the reaction product is primed with the priming solution containing the visualization agent, the constituent element derived from the ethylenically unsaturated monomer and the visualization agent electrostatically interact with each other, and cations or anions of the constituent element derived from the ethylenically unsaturated monomer and anions or cations of the visualization agent are ionically bonded to each other. Therefore, after the embolic agent is indwelled in a predetermined site (e.g., an aneurysm), the visualization agent relatively slowly flows out and diffuses in a body fluid (e.g., blood) (the visibility of the visualization agent is slowly reduced). That is, in at least one embodiment of the present disclosure, the ethylenically unsaturated monomer has an ionic functional group, and the visualization agent forms in the priming solution a counter ion for the ionic functional group of the ethylenically unsaturated monomer. In some embodiments, examples of the ethylenically unsaturated monomer which forms anions in the priming solution include a compound containing a carboxyl group (or a salt thereof) such as (meth)acrylic acid and a salt thereof, and a compound containing a sulfonic acid group (or a salt thereof) such as 2-(meth)acryloylethanesulfonic acid and a salt thereof. In addition, examples of the ethylenically unsaturated monomer which forms cations in the priming solution include a compound containing an amide group such as N,N-dimethylaminopropyl (meth)acrylamide and a quaternized product thereof. Examples of the visualization agent which forms anions in the priming solution include sodium amidetrizoate meglumine, oxagolic acid, meglumine iontroxate, sodium iothalamate, and iothalamate meglumine. Here, a mixing ratio of the reaction product to the priming solution in the embolic agent kit is not particularly limited, and may be appropriately selected according to a desired rate of decrease in visibility. For example, the mixing ratio of the reaction product to the priming solution (the weight ratio of the reaction product to the visualization agent) in the embolic agent kit may be 1:50 to 1:1000, and/or 1:100 to 1:500.

Alternatively, the visualization agent may be hardly ionized by the priming solution (nonionic). In such an embodiment, even if the reaction product is primed with the priming solution containing the visualization agent, the constituent element of the reaction product (e.g., ethylenically unsaturated monomer) and the visualization agent hardly interact with each other. Therefore, after the embolic agent is indwelled in a predetermined site (e.g., an aneurysm), the visualization agent relatively rapidly flows out and diffuses into a body fluid (e.g., blood) (the visibility of the visualization agent is rapidly reduced). That is, in another embodiment of the present disclosure, the visualization agent is nonionic in the priming solution. Examples of the nonionic visualization agent include iohexol, iopamidol, iopromide, iomeprol, iotrolan, ioversol, iodixanol, and ioxilan. Here, the amount of the priming solution to be used to the weight of the reaction product in the embolic agent kit is not particularly limited, and may be appropriately selected according to a desired rate of decrease in visibility. For example, the ratio (weight ratio) of the amount of the priming solution to be used to the weight of the reaction product in the embolic agent kit may be 1:1 to 1:1000, and/or 1:2 to 1:500.

As the priming solution, a commercially available product may be used, and examples of the commercially available product may include, but are in no way limited to, Iopaque (manufactured by Fuji Pharma Co., Ltd.), Omnipaque (manufactured by Daiichi Sankyo Co., Ltd.), Iopamiron (manufactured by Bayer Yakuhin, Ltd.), Iomeron (manufactured by Eisai Co., Ltd.), Optiray (manufactured by Guerbet Japan Co., Ltd.), Proscope (manufactured by Alfresa Pharma Corporation), Visipaque (manufactured by Daiichi Sankyo Co., Ltd.), Urografin (manufactured by Bayer Yakuhin, Ltd.), and Hexabrix (manufactured by Guerbet Japan Co., Ltd.). In addition, the priming solution may be diluted with a solvent usually used in priming a catheter. Specific examples of the priming solution include buffer solutions such as sterilized water, physiological saline, phosphate buffered saline (PBS), and a Tris buffer solution, and physiological salt solutions such as a Ringer solution and a Locke solution. Among these, physiological saline may be used from the viewpoint of solubility of the visualization agent or the like. The pH of the priming solution is not particularly limited, and may be about 6.8 to 7.6, which is equivalent to the pH of a living body. In addition, the amount of the solvent to be used is not particularly limited, and the same amount as that used for priming a catheter is usually used. Specifically, the amount of the solvent to be used is such an amount that the concentration of the visualization agent in the priming solution may be 15 milligrams per milliliter (mg/mL) to 1500 mg/mL, and/or 100 mg/mL to 1000 mg/mL.

In the embolic agent kit of the present disclosure, the reaction product is accommodated in a catheter inner cavity. Here, the catheter is not particularly limited, and an elongated catheter (introducer sheath) which is usually used for accommodating an embolic agent can be used. Specifically, catheters (elongated bodies) disclosed in Japanese Patent Application Nos. 2015-181673, 2014-221432, 2013-198668, or the like can be used.

In the embolic agent kit of the present disclosure, a reaction product and a priming solution containing a visualization agent are separately prepared. By priming the reaction product with the priming solution, an embolic agent having a contrasting property is obtained. That is, the present disclosure also provides a method for preparing an embolic agent. The method includes impregnating a reaction product of a bifunctional macromer, an ethylenically unsaturated monomer, and a crosslinking agent with a priming solution containing a visualization agent.

According to the present disclosure, when the reaction product accommodated in the inner cavity of the catheter is primed with the priming solution containing the visualization agent, the air in the catheter inner cavity is removed, and the contrasting property is imparted to the reaction product. Therefore, since the prime reaction product (embolic agent) contains a visualization agent in a high density, the position of the embolic agent can be sufficiently visually recognized by appropriate means such as X-rays until the embolic agent is indwelled in a predetermined site. On the other hand, after indwelling, the visualization agent flows out and diffuses into a body fluid (e.g., blood), and the reaction product swells. Therefore, the amount (density) of the visualization agent in the embolic agent after swelling is reduced, and the visibility by appropriate means such as X-rays is reduced. Therefore, even after indwelling, the embolic agent hardly or does not interfere with the confirmation of the inflow of the contrast agent into the aneurysm through a blood vessel (e.g., an inferior mesenteric artery, or a lumbar artery) causing an endoleak. Therefore, by using the embolic agent of the present disclosure, it is possible to effectively confirm the presence or absence of an endoleak, particularly an endoleak Type II. In addition, after the embolic agent (reaction product) is indwelled in a desired site (e.g., an aneurysm), the embolic agent (reaction product) swells, so that a void between the desired site and the stent graft can be filled a small number of times. The present disclosure is not limited to the above.

Therefore, it is particularly effective to use the embolic agent of the present disclosure in combination with stent graft interpolation. Therefore, the present disclosure provides the embolic agent kit according to the first or second aspect which is used in a method for treating an aneurysm. The method includes introducing a graft into an aneurysm of a patient requiring the treatment, and then introducing a reaction product (embolic agent) primed with a priming solution into a space formed between an inner surface of the aneurysm and an outer surface of the graft. In addition, the present disclosure also provides a treatment system including the embolic agent kit according to the first or second aspect and a graft. In the above aspect, the treatment system is used in a method for treating an aneurysm. The method includes introducing a graft into an aneurysm of a patient requiring the treatment, and then introducing a reaction product (embolic agent) primed with a priming solution into a space formed between an inner surface of the aneurysm and an outer surface of the graft. As will be described in detail below, the reaction product (embolic agent) primed with the priming solution is indwelled from a catheter inner cavity into a desired site (e.g., an aneurysm) by a pusher. Therefore, the embolic agent kit according to the present disclosure may further include a pusher (elongated extrusion pusher) configured to extrude the reaction product primed with the priming solution from an inner cavity of the catheter.

In addition, as will be described in detail below, in the embolic agent kit of the present disclosure, a filled catheter in which a reaction product is filled in an inner cavity of a catheter is prepared, a priming solution is introduced into the filled catheter to prime the reaction product with the priming solution, and then the reaction product is indwelled in a desired site (e.g., an aneurysm) from a catheter inner cavity by a pusher. Therefore, in an embodiment of the present disclosure, there is also provided an embolic agent kit according to the first or second aspect which is used in a method for treating an aneurysm. The method includes: preparing a filled catheter in which the reaction product is filled in the inner cavity of the catheter; introducing a gel insertion catheter into an aneurysm of a patient requiring the treatment; introducing a graft into the aneurysm; priming the inner cavity of the filled catheter with the priming solution to obtain a prime reaction product; inserting the filled catheter primed with the priming solution into the gel insertion catheter; and inserting at least one pusher (e.g., an extrusion pusher and, if necessary, a delivery pusher) into the inner cavity of the filled catheter and an inner cavity of the gel insertion catheter to extrude the prime reaction product into a space formed between an outer surface of the graft and an inner surface of the aneurysm. In some embodiments, there is also provided an embolic agent kit according to the first or second aspect which is used in a method for treating an aneurysm. The method includes: preparing a filled catheter in which the reaction product is filled in the inner cavity of the catheter; introducing a gel insertion catheter into an aneurysm of a patient requiring the treatment; introducing a graft into the aneurysm; priming the inner cavity of the filled catheter with the priming solution to obtain a prime reaction product; inserting the filled catheter primed with the priming solution into an inner cavity of the gel insertion catheter; inserting an extrusion pusher (elongated extrusion pusher) into the inner cavity of the gel-filled catheter, and extruding the prime reaction product into an inner cavity of the gel insertion catheter by the extrusion pusher; and inserting an delivery pusher (e.g., an elongated delivery pusher) into the inner cavity of the gel insertion catheter, and extruding, by the delivery pusher, the prime reaction product in the inner cavity of the gel insertion catheter into a space formed between an outer surface of the graft and an inner surface of the aneurysm. Similarly, in an embodiment of the present disclosure, there is also provided a treatment system according to the third aspect which is used in a method for treating an aneurysm. The method includes: preparing a filled catheter in which the reaction product is filled in the inner cavity of the catheter; introducing a gel insertion catheter into an aneurysm of a patient requiring the treatment; introducing a graft into the aneurysm; priming the inner cavity of the filled catheter with the priming solution to obtain a prime reaction product; inserting the filled catheter primed with the priming solution into the gel insertion catheter; and inserting at least one pusher (e.g., an extrusion pusher and, if necessary, a delivery pusher) into the inner cavity of the filled catheter and an inner cavity of the gel insertion catheter to extrude the prime reaction product into a space formed between an outer surface of the graft and an inner surface of the aneurysm. In some embodiments, similarly, there is also provided a treatment system according to the third aspect which is used in a method for treating an aneurysm. The method includes: preparing a filled catheter in which the reaction product is filled in the inner cavity of the catheter; priming the inner cavity of the filled catheter with the priming solution to obtain a prime reaction product; introducing a graft into an aneurysm of a patient requiring the treatment; introducing a gel insertion catheter into the aneurysm; inserting the filled catheter primed with the priming solution into an inner cavity of the gel insertion catheter; inserting an extrusion pusher into the inner cavity of the filled catheter, and extruding the prime reaction product into the inner cavity of the gel insertion catheter by the extrusion pusher; and inserting a delivery pusher into the inner cavity of the gel insertion catheter, and extruding, by the delivery pusher, the prime reaction product in the inner cavity of the gel insertion catheter into a space formed between an outer surface of the graft and an inner surface of the aneurysm.

In an embodiment of the present disclosure, there is also provided a method for treating an aneurysm. The method includes: preparing a filled catheter in which a reaction product of an ethylenically unsaturated monomer, a crosslinking agent, and, if necessary, a bifunctional macromer is filled in an inner cavity of a catheter; introducing a gel insertion catheter into an aneurysm of a patient requiring an aneurysm treatment; introducing a graft into the aneurysm; priming the inner cavity of the filled catheter with a priming solution containing a visualization agent to obtain a prime reaction product; inserting, into the gel insertion catheter, the filled catheter whose inner cavity has the prime reaction product; and inserting at least one pusher (e.g., an extrusion pusher and, if necessary, a delivery pusher) into the inner cavity of the filled catheter and an inner cavity of the gel insertion catheter to extrude the prime reaction product into a space formed between an outer surface of the graft and an inner surface of the aneurysm. In some embodiments, there is also provided a method for treating an aneurysm. The method includes: preparing a filled catheter in which a reaction product of an ethylenically unsaturated monomer, a crosslinking agent, and, if necessary, a bifunctional macromer is filled in an inner cavity of a catheter; priming the inner cavity of the filled catheter with a priming solution containing a visualization agent to obtain a prime reaction product; introducing a graft into an aneurysm of a patient requiring an aneurysm treatment; introducing a gel insertion catheter into the aneurysm; inserting, into an inner cavity of the gel insertion catheter, the filled catheter whose inner cavity has the prime reaction product; inserting an extrusion pusher into the inner cavity of the filled catheter, and extruding the prime reaction product into the inner cavity of the gel insertion catheter by the extrusion pusher; and inserting a delivery pusher into the inner cavity of the gel insertion catheter, and extruding, by the delivery pusher, the prime reaction product in the inner cavity of the gel insertion catheter into a space formed between an outer surface of the graft and an inner surface of the aneurysm.

Hereinafter, the uses provided above will be described with reference to FIGS. 1A to 1H assuming that a treatment target is an aneurysm. In the present disclosure, the same procedure as the known method disclosed in Japanese Patent Application Nos. 2015-181673, 2014-221432, 2013-198668, or the like can be applied except that the embolic agent according to the first or second aspect is used. Therefore, the present disclosure is not limited to the following.

Figure 1B:
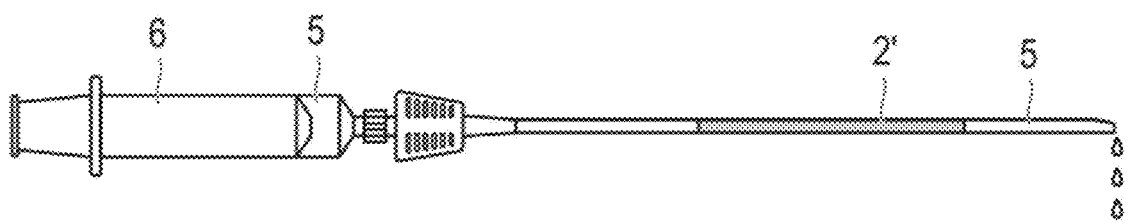
FIG. 1B is a diagram illustrating aspects of the method of using the embolic agent according to the embodiment of the present disclosure.

First, a catheter 1 (filled catheter, introducer catheter) in which an inner cavity is filled with a reaction product (dehydrated state) (e.g., a dehydrated hydrogel filament) 2 according to the present disclosure, an extrusion pusher 3, and a delivery pusher 4 are prepared (as shown in FIG. 1A). Here, the reaction product is in a dehydrated state (e.g., dehydrated hydrogel filament). A size of the catheter 1 (filled catheter, introducer catheter) is not particularly limited, and is appropriately selected depending on a size of the reaction product (e.g., dehydrated hydrogel filament) for filling, a size of a site (aneurysm) to be adapted, a size of a gel insertion catheter for indwelling the reaction product in an aneurysm, or the like. For example, the reaction product (dehydrated hydrogel filament) may have a size as described above. Here, the catheter 1 may have a straight shape, or may have a spiral shape in order to compactly accommodate a long reaction product. A length of the catheter 1 (filled catheter, introducer catheter) may be about 3 cm to 500 cm, and/or about 10 cm to 100 cm. With such a length, the reaction product can be easily extruded from the gel insertion catheter, the number of reaction products to be inserted into the aneurysm can be reduced, and the efficiency is good. An inner diameter of the catheter 1 (filled catheter, introducer catheter) is about 0.4 mm to 3.4 mm. An outer diameter of the catheter 1 (filled catheter, introducer catheter) is about 0.5 mm to 3.5 mm. In addition, the extrusion pusher 3 is used to extrude a reaction product (prime reaction product, embolic agent) primed with a priming solution from the catheter 1 into a gel insertion catheter 13 for indwelling the reaction product in an aneurysm, which will be described in detail below. A size of the extrusion pusher 3 is not particularly limited, and is appropriately selected according to the size of the catheter 1. For example, a length of the extrusion pusher 3 is about 3.5 cm to 501 cm (in some embodiments, 10.5 cm to 101 cm). An outer diameter of the extrusion pusher 3 may be about 0.02 mm to 2.0 mm smaller than the inner diameter of the catheter 1 from the viewpoint of easily extruding the prime reaction product. The delivery pusher 4 is used to extrude the prime reaction product (embolic agent), which is extruded into the gel insertion catheter 13, from the gel insertion catheter 13 to an aneurysm 14, which will be described in detail below. A size of the delivery pusher 4 is not particularly limited, and is appropriately selected according to the size of the gel insertion catheter 13. For example, a length of the delivery pusher 4 is about 20 cm to 1000 cm. An outer diameter of the delivery pusher 4 may be about 0.02 mm to 5.0 mm smaller than an inner diameter of the gel insertion catheter 13 from the viewpoint of easily extruding the prime reaction product. A priming solution 5 is introduced into the inner cavity of the filled catheter 1 through a syringe 6 to remove the air in the catheter inner cavity (priming), and at the same time, a contrasting property (visibility) is imparted to the reaction product. Accordingly, a prime reaction product (embolic agent) 2' (before swelling) is prepared in the catheter (filled catheter) 1 (as shown in FIG. 1B). By performing the priming treatment before the indwelling operation on the reaction product in this manner, swelling of the reaction product can be prevented (clogging in the filled catheter can be prevented).

Figure 1C:
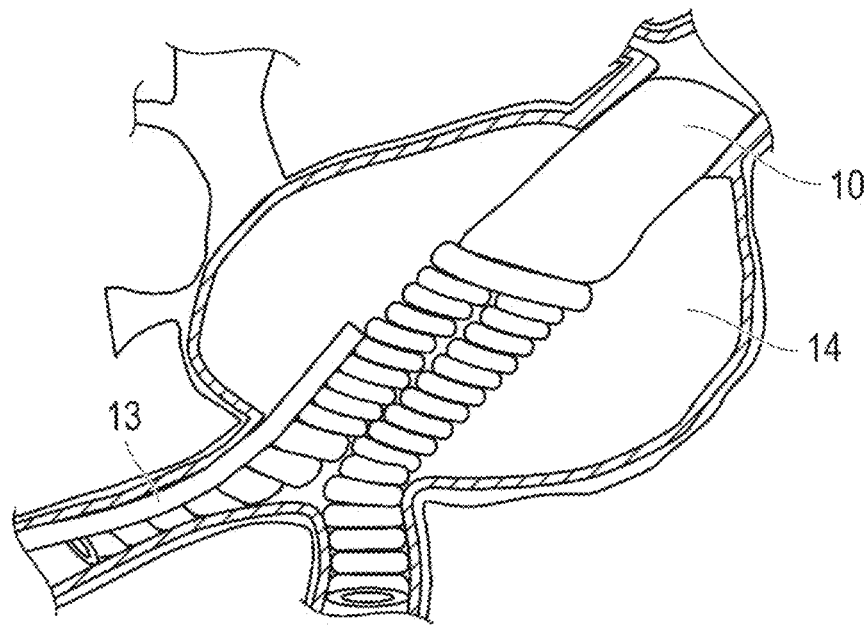
FIG. 1C is a diagram illustrating an aspect of the method of using the embolic agent according to the embodiment of the present disclosure.

Next, the gel insertion catheter 13 is inserted and indwelled into the aneurysm 14 from a femoral artery under X-ray fluoroscopy by a standard intervention procedure. Next, a stent graft 10 is indwelled in the aneurysm 14 of the patient requiring the treatment according to an instruction from a manufacturer (as shown in FIG. 1C). In the present embodiment, the gel insertion catheter is introduced before the stent graft is introduced, but the introduction order is not limited to the above embodiment, and the stent graft may be introduced before the gel insertion catheter is introduced. That is, in a treatment system (or a method for treating an aneurysm) to be used in a method for treating an aneurysm according to the present disclosure, the method may include: preparing a filled catheter in which the reaction product is filled in a catheter inner cavity; introducing a graft into an aneurysm of a patient requiring the treatment; introducing a gel insertion catheter into the aneurysm; priming the inner cavity of the filled catheter with the priming solution to obtain a prime reaction product; inserting the filled catheter primed with the priming solution into an inner cavity of the gel insertion catheter; and inserting at least one pusher (e.g., an extrusion pusher and, if necessary, a delivery pusher) into the inner cavity of the filled catheter and the inner cavity of the gel insertion catheter to extrude the prime reaction product into a space formed between an outer surface of the graft and an inner surface of the aneurysm. In some embodiments, the method includes: preparing a filled catheter in which the reaction product is filled in a catheter inner cavity; introducing a graft into an aneurysm of a patient requiring the treatment; introducing a gel insertion catheter into the aneurysm; priming the inner cavity of the filled catheter with the priming solution to obtain a prime reaction product; inserting the filled catheter primed with the priming solution into an inner cavity of the gel insertion catheter; inserting an extrusion pusher into the inner cavity of the filled catheter, and extruding the prime reaction product into the inner cavity of the gel insertion catheter by the extrusion pusher; and inserting a delivery pusher into the inner cavity of the gel insertion catheter, and extruding, by the delivery pusher, the prime reaction product in the inner cavity of the gel insertion catheter into a space formed between an outer surface of the graft and an inner surface of the aneurysm.

Figure 1D:
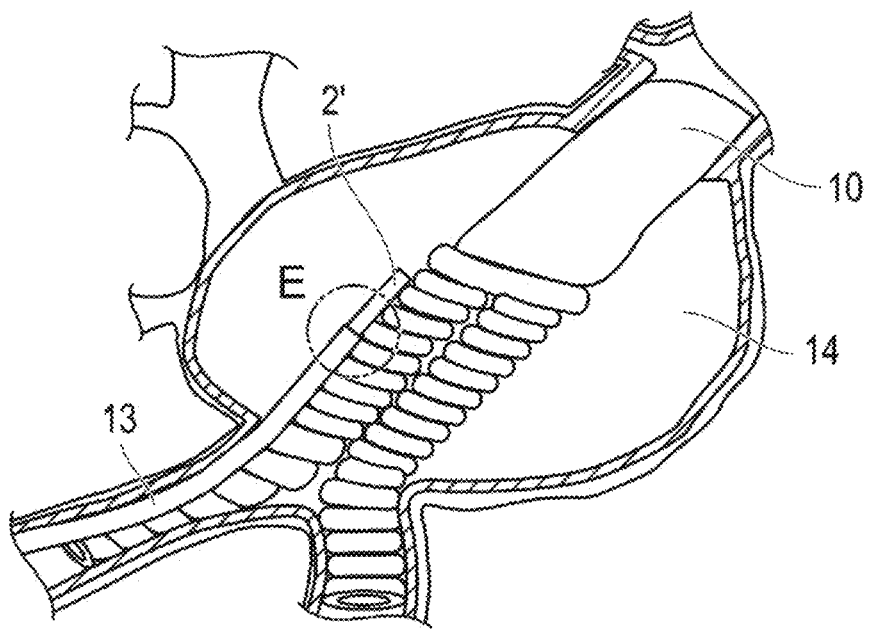
FIG. 1D is a diagram illustrating an aspect the method of using the embolic agent according to the embodiment of the present disclosure.
Figure 1E:
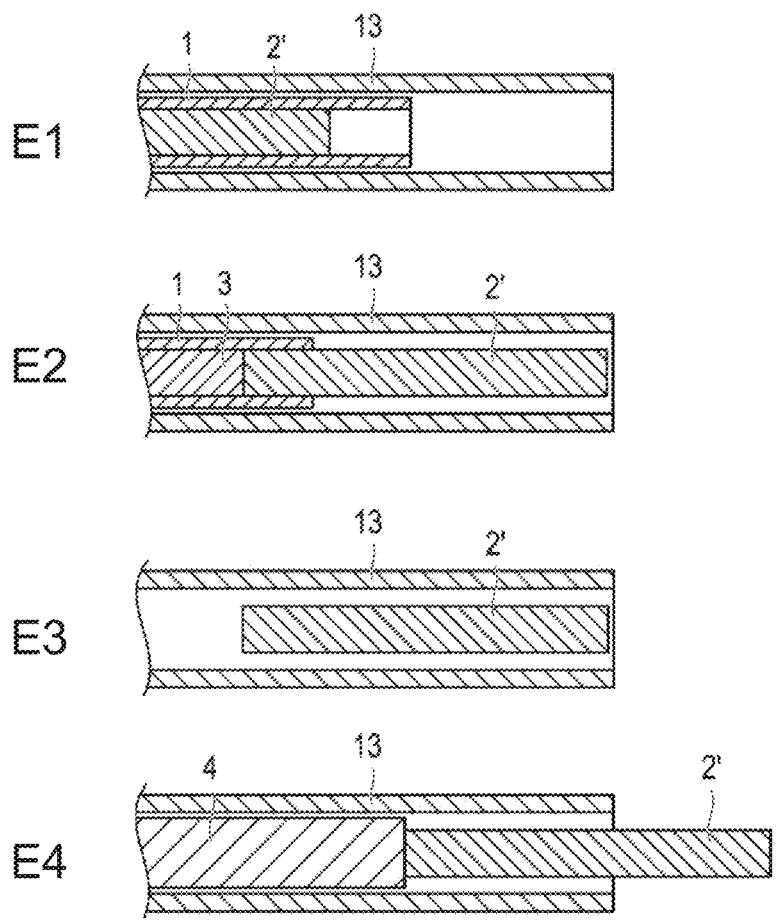
FIG. 1E illustrates diagrams of various aspects of the method of using the embolic agent according to the embodiment of the present disclosure.
Figure 1F:
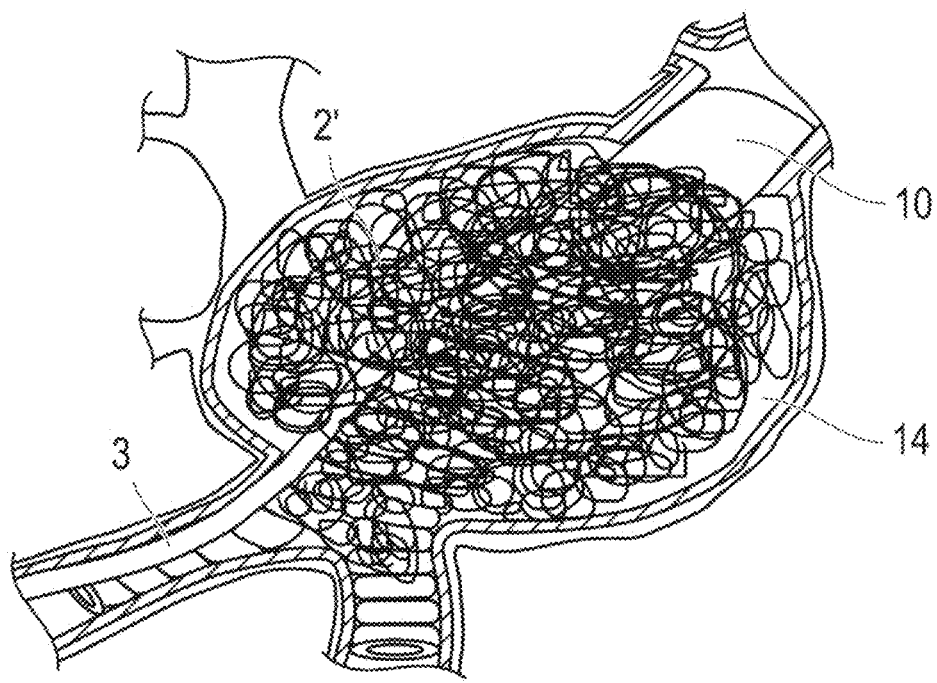
FIG. 1F is a diagram illustrating an aspect of the method of using the embolic agent according to the embodiment of the present disclosure.
Figure 1G:
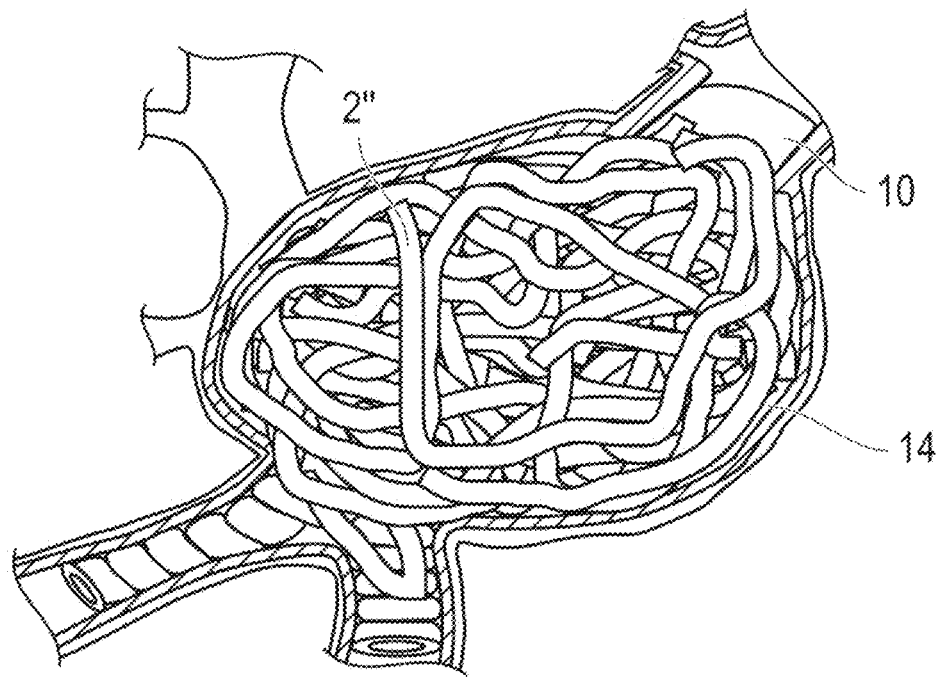
FIG. 1G is a diagram illustrating an aspect of the method of using the embolic agent according to the embodiment of the present disclosure.

The catheter 1 (accommodating the prime reaction product 2') prepared as described above is inserted into the inner cavity of the gel insertion catheter 13 (as shown in state E1 of FIG. 1E), and the prime reaction product 2' is extruded into the inner cavity of the gel insertion catheter 13 using the extrusion pusher 3 (as shown in state E2 of FIG. 1E). After the catheter 1 is removed (as shown in state E3 of FIG. 1E), the prime reaction product 2' is extruded, by using the delivery pusher 4, from a front end of the gel insertion catheter 13 into a space formed between an outer surface of the stent graft 10 and an inner surface of the aneurysm 14 (as shown in FIG. 1D and state E4 of FIG. 1E). Accordingly, the prime reaction product 2' in a dehydrated state comes into contact with the blood and swells (prime reaction product 2"). The above operation is repeated until the prime reaction product 2' sufficiently fills the space between the inner surface of the aneurysm 14 and the outer surface of the stent graft 10 (a volume of the swelled prime reaction product 2' is greater than or equal to a volume of the space between the inner surface of the aneurysm 14 and the outer surface of the stent graft 10) (as shown in FIG. 1F). After confirming that an appropriate amount of the prime reaction product 2" in a swelled state is indwelled in the aneurysm 14, the delivery pusher 4 and the gel insertion catheter 13 are removed. Accordingly, the space between the inner surface of the aneurysm 14 and the outer surface of the stent graft 10 is filled with a sufficient amount of the prime reaction product 2" (as shown in FIG. 1G).

In the above embodiment, an embolus may be directly extruded into the aneurysm from the catheter 1 (gel-filled catheter, introducer catheter) in a state where the catheter 1 is inserted into the gel insertion catheter 13. That is, in another embodiment of the present disclosure, there is also provided an embolic agent kit or a treatment system used in a method for treating an aneurysm. The method includes: preparing a gel-filled catheter in which the reaction product according to the present disclosure is filled in a catheter inner cavity; introducing a gel insertion catheter into an aneurysm of a patient requiring the treatment; introducing a graft into the aneurysm; priming the inner cavity of the filled catheter with the priming solution to obtain a prime reaction product; inserting the gel-filled catheter primed with the priming solution into an inner cavity of the gel insertion catheter; inserting an extrusion pusher (elongated extrusion pusher) into the inner cavity of the gel-filled catheter; and extruding, by the extrusion pusher, the prime reaction product into a space formed between an outer surface of the graft and an inner surface of the aneurysm via the gel insertion catheter.

In another embodiment of the present disclosure, there is also provided a method for treating an aneurysm. The method includes: preparing a gel-filled catheter in which a reaction product of an ethylenically unsaturated monomer, a crosslinking agent, and, if necessary, a bifunctional macromer is filled in an catheter inner cavity; introducing a gel insertion catheter into an aneurysm of a patient requiring an aneurysm treatment; introducing a graft into the aneurysm; priming the inner cavity of the filled catheter with a priming solution containing a visualization agent to obtain a prime reaction product; inserting, into an inner cavity of the gel insertion catheter, the gel-filled catheter whose inner cavity has the prime reaction product; inserting an extrusion pusher (elongated extrusion pusher) into the inner cavity of the gel-filled catheter; and extruding, by the extrusion pusher, the prime reaction product into a space formed between an outer surface of the graft and an inner surface of the aneurysm via the gel insertion catheter.

Hereinafter, the above embodiment will be described with reference to FIGS. 2A to 2G. In the following description, the description of the same parts as those in FIGS. 1A to 1H will be omitted.

Figure 2A:
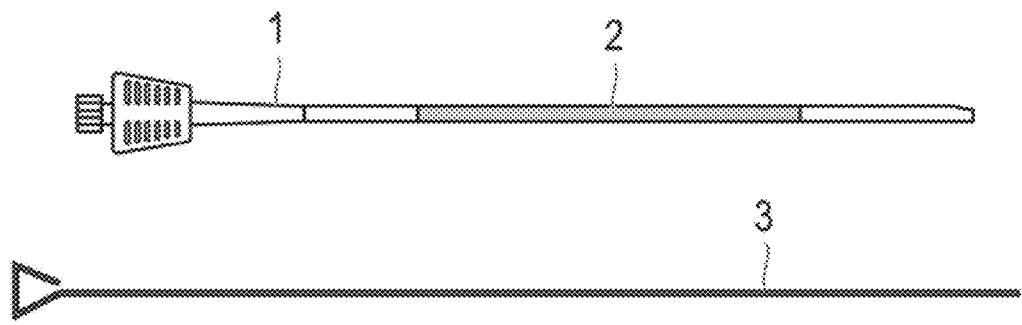
FIG. 2A is a diagram illustrating a method of using an embolic agent according to another embodiment of the present disclosure.
Figure 2B:
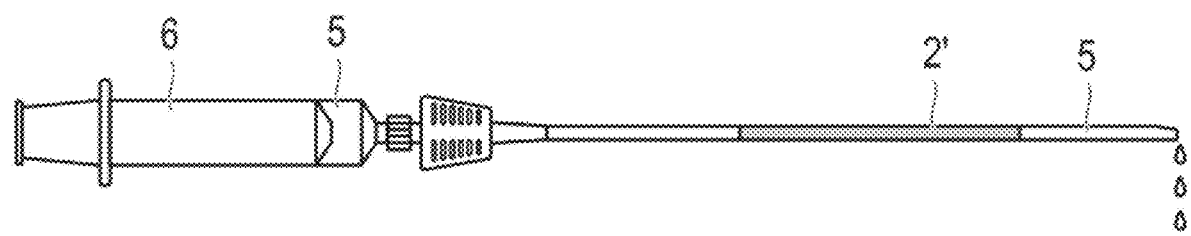
FIG. 2B is a diagram illustrating aspects of the method of using the embolic agent according to the another embodiment of the present disclosure.
Figure 2C:
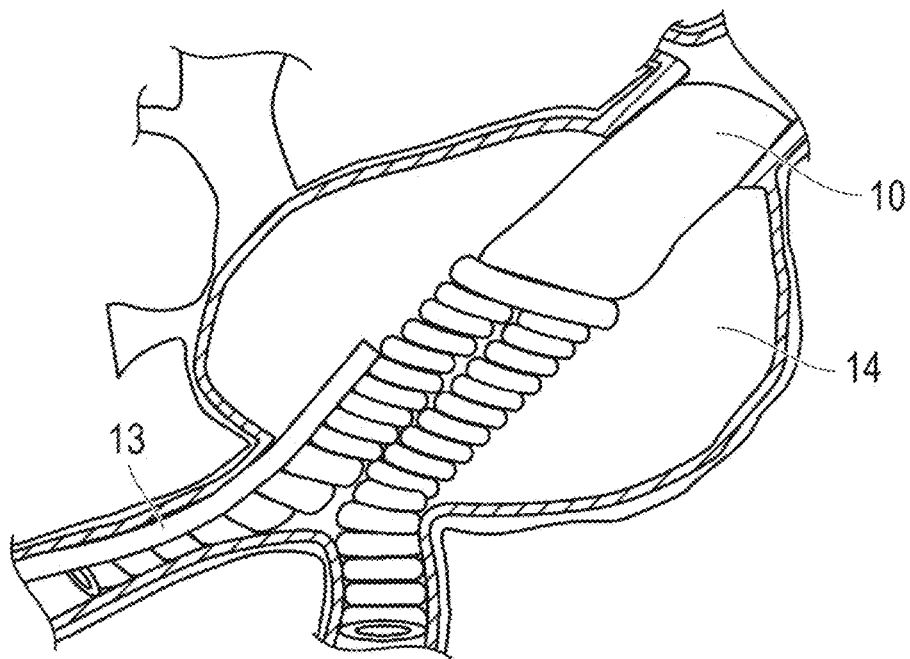
FIG. 2C is a diagram illustrating an aspect of the method of using the embolic agent according to the another embodiment of the present disclosure.
Figure 2D:
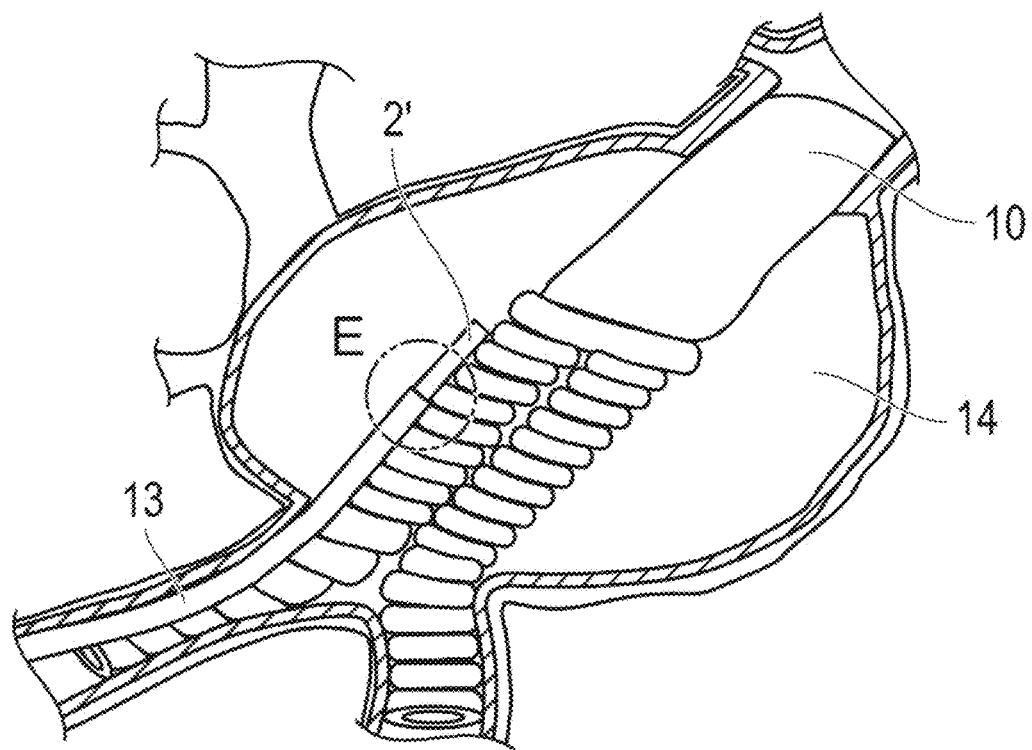
FIG. 2D is a diagram illustrating an aspect of the method of using the embolic agent according to the another embodiment of the present disclosure.
Figure 2E:
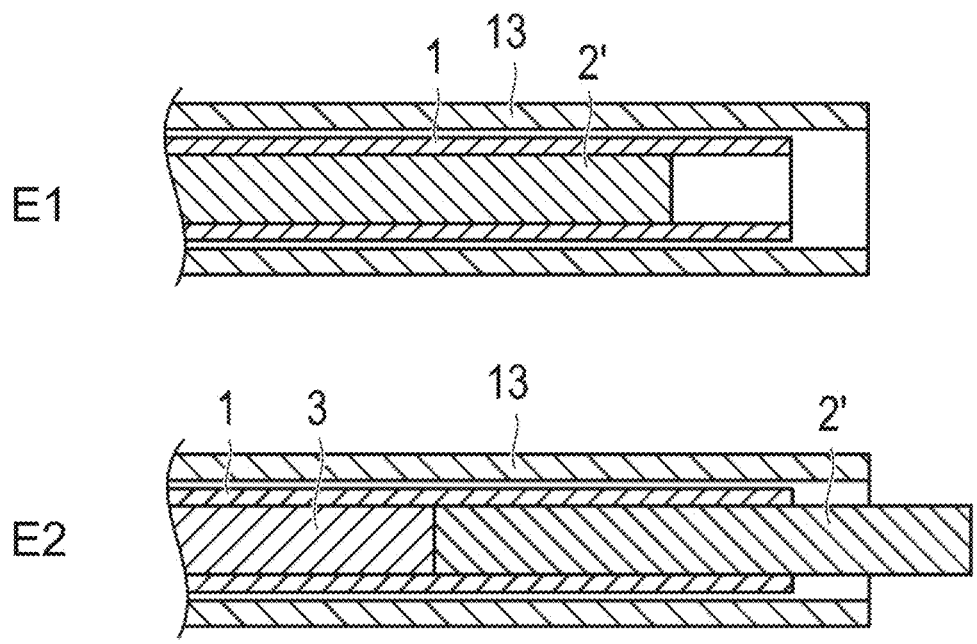
FIG. 2E is a diagram illustrating aspects of the method of using the embolic agent according to the another embodiment of the present disclosure.
Figure 2F:
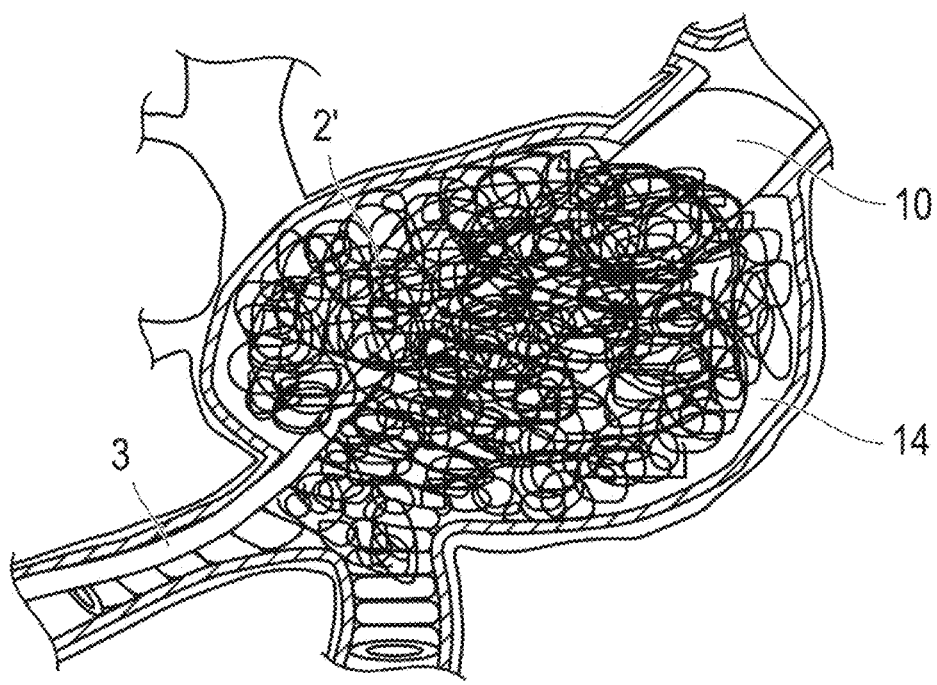
FIG. 2F is a diagram illustrating an aspect of the method of using the embolic agent according to the another embodiment of the present disclosure.
Figure 2G:
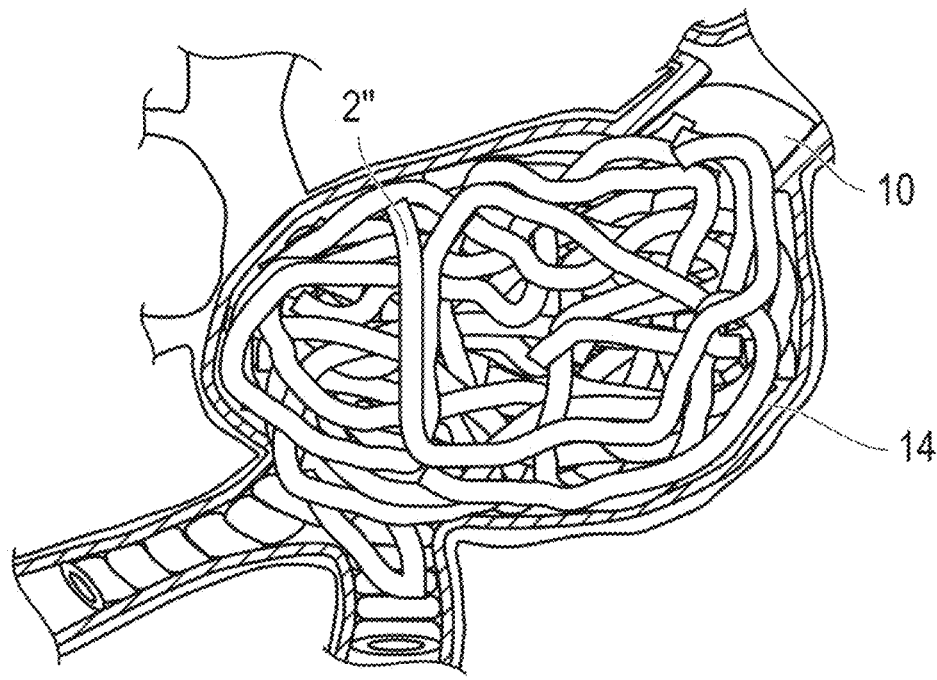
FIG. 2G is a diagram illustrating an aspect of the method of using the embolic agent according to the another embodiment of the present disclosure.

First, the catheter 1 (gel-filled catheter, introducer catheter) in which the inner cavity is filled with the reaction product (dehydrated state) (e.g., dehydrated hydrogel filament) 2 according to the present disclosure and the extrusion pusher 3 are prepared (as shown in FIG. 2A). Next, the priming solution 5 is introduced into the inner cavity of the filled catheter 1 through the syringe 6 to remove the air in the catheter inner cavity (priming), and at the same time, the contrasting property (visibility) is imparted to the reaction product. Accordingly, the prime reaction product (embolic agent) 2' (before swelling) is prepared in the catheter (filled catheter) 1 (as shown in FIG. 2B). By performing the priming treatment before the indwelling operation on the reaction product in this manner, swelling of the reaction product can be prevented (clogging in the filled catheter can be prevented). Further, after the gel insertion catheter 13 is inserted and indwelled into the aneurysm 14 from a femoral artery under X-ray fluoroscopy by a standard intervention procedure, the stent graft 10 is indwelled in the aneurysm 14 of the patient requiring the treatment according to an instruction from a manufacturer (as shown in FIG. 2C). In the present embodiment, the gel insertion catheter is introduced before the stent graft is introduced, but the introduction order is not limited to the above embodiment, and the stent graft may be introduced before the gel insertion catheter is introduced. Next, the catheter 1 prepared as described above (accommodating the prime reaction product 2') is inserted into the vicinity of the front end of the gel insertion catheter 13 (a region extruded by about 1 mm to 2 mm from an end surface of the gel insertion catheter 13 or on a proximal end side) (as shown in state E1 of FIG. 2E). Further, the prime reaction product 2' is extruded from the gel insertion catheter 13 using the extrusion pusher 3, and indwelled in the space formed between the outer surface of the stent graft 10 and the inner surface of the aneurysm 14 (as shown in FIG. 2D and state E2 of FIG. 2E). Accordingly, the prime reaction product 2' in a dehydrated state comes into contact with the blood and swells (prime reaction product 2"). The above operation is repeated until an appropriate amount of the prime reaction product 2' sufficiently fills the space between the inner surface of the aneurysm 14 and the outer surface of the stent graft 10 (a volume of the swelled prime reaction product 2" greater than or equal to a volume of the space between the inner surface of the aneurysm 14 and the outer surface of the stent graft 10) (as shown in FIG. 2F). After confirming that an appropriate amount of the prime reaction product 2" in a swelled state is indwelled in the aneurysm 14, the extrusion pusher 3 and the gel insertion catheter 13 are removed. Accordingly, the space between the inner surface of the aneurysm 14 and the outer surface of the stent graft 10 is filled with a sufficient amount of the prime reaction product 2" (as shown in FIG. 2G).

Figure 1H:
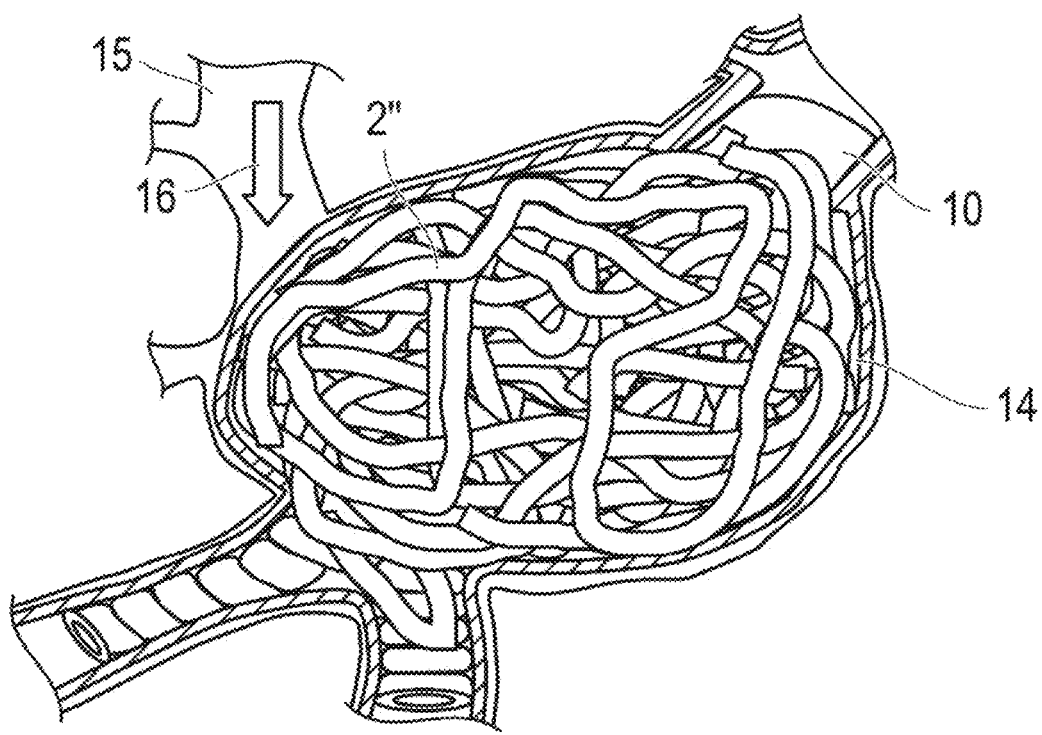
FIG. 1H is a diagram illustrating an aspect of the method of using the embolic agent according to the embodiment of the present disclosure.

Here, since the prime reaction product (embolic agent) 2' does not come into contact with the blood until indwelling, the visualization agent is present in the prime reaction product 2' at a high density. Therefore, until the prime reaction product 2' is indwelled in the aneurysm 14, the prime reaction product 2' can be satisfactorily visually recognized by appropriate means such as X-ray fluoroscopy. On the other hand, when the prime reaction product 2' is indwelled in the aneurysm 14, the visualization agent contained in the prime reaction product 2' flows out and diffuses into the aneurysm by the blood flow. In addition, the prime reaction product 2' absorbs the blood in the aneurysm and swells (the prime reaction product 2" in the swelled state in FIG. 1G or FIG. 2G). Therefore, the density of the visualization agent in the prime reaction product 2" in the swelled state is reduced. Therefore, the visibility of the prime reaction product 2" in the swelled state is reduced. Therefore, when a contrast agent is flowed from an aorta in order to confirm an endoleak 16 from an inferior mesenteric artery 15 or a lumbar artery, the prime reaction product 2" in the swelled state hardly or does not interfere with the confirmation of the inflow and outflow of the contrast agent into and from the aneurysm 14 and between the inferior mesenteric artery and the lumbar artery (as shown in FIG. 1H). Therefore, by using the embolic agent kit of the present disclosure, it is possible to effectively confirm the presence or absence of an endoleak, particularly an endoleak Type II.

That is, in still another embodiment of the present disclosure, there is also provided a diagnosis system used in a method for diagnosing an endoleak. The method includes: preparing a gel-filled catheter in which a reaction product of an ethylenically unsaturated monomer, a crosslinking agent, and, if necessary, a bifunctional macromer is filled in an inner cavity of a catheter; introducing a gel insertion catheter into an aneurysm of a patient requiring a treatment; introducing a graft into the aneurysm; priming the inner cavity of the filled catheter with a priming solution containing a visualization agent to obtain a prime reaction product; inserting, into an inner cavity of the gel insertion catheter, the filled catheter whose inner cavity has the prime reaction product; inserting an elongated extrusion pusher into the inner cavity of the filled catheter, and extruding the prime reaction product into the inner cavity of the gel insertion catheter by the extrusion pusher; and inserting an elongated delivery pusher into the inner cavity of the gel insertion catheter, and extruding, by the delivery pusher, the prime reaction product in the inner cavity of the gel insertion catheter into a space formed between an outer surface of the graft and an inner surface of the aneurysm.

In still another embodiment of the present disclosure, there is also provided a diagnosis system used in a method for diagnosing an endoleak. The method includes: preparing a gel-filled catheter in which a reaction product of an ethylenically unsaturated monomer, a crosslinking agent, and, if necessary, a bifunctional macromer is filled in an inner cavity of a catheter; introducing a gel insertion catheter into an aneurysm of a patient requiring a treatment; introducing a graft into the aneurysm; priming the inner cavity of the filled catheter with a priming solution containing a visualization agent to obtain a prime reaction product; inserting, into an inner cavity of the gel insertion catheter, the filled catheter whose inner cavity has the prime reaction product; inserting an elongated extrusion pusher into the inner cavity of the filled catheter; and extruding, by the extrusion pusher, the prime reaction product into a space formed between an outer surface of the graft and an inner surface of the aneurysm via the gel insertion catheter.

In yet still another embodiment of the present disclosure, there is also provided a method for diagnosing an endoleak. The method includes: preparing a gel-filled catheter in which a reaction product of an ethylenically unsaturated monomer, a crosslinking agent, and, if necessary, a bifunctional macromer is filled in an inner cavity of a catheter; introducing a gel insertion catheter into an aneurysm of a patient requiring a treatment; introducing a graft into the aneurysm; priming the inner cavity of the filled catheter with a priming solution containing a visualization agent to obtain a prime reaction product; inserting, into an inner cavity of the gel insertion catheter, the filled catheter whose inner cavity has the prime reaction product; inserting an elongated extrusion pusher into the inner cavity of the filled catheter, and extruding the prime reaction product into the inner cavity of the gel insertion catheter by the extrusion pusher; inserting an elongated delivery pusher into the inner cavity of the gel insertion catheter, and extruding, by the delivery pusher, the prime reaction product in the inner cavity of the gel insertion catheter into a space formed between an outer surface of the graft and an inner surface of the aneurysm; and then determining the presence or absence of an endoleak by flowing a contrast agent into the aneurysm.

In yet still another embodiment of the present disclosure, there is also provided a method for diagnosing an endoleak. The method includes: preparing a gel-filled catheter in which a reaction product of an ethylenically unsaturated monomer, a crosslinking agent, and, if necessary, a bifunctional macromer is filled in an inner cavity of a catheter; introducing a gel insertion catheter into an aneurysm of a patient requiring a treatment; introducing a graft into the aneurysm; priming the inner cavity of the filled catheter with a priming solution containing a visualization agent to obtain a prime reaction product; inserting, into an inner cavity of the gel insertion catheter, the filled catheter whose inner cavity has the prime reaction product; inserting an elongated extrusion pusher into the inner cavity of the filled catheter; extruding, by the extrusion pusher, the prime reaction product into a space formed between an outer surface of the graft and an inner surface of the aneurysm via the gel insertion catheter; and then determining the presence or absence of an endoleak by flowing a contrast agent into the aneurysm.

Effects of the present disclosure will be described with reference to the following Examples and Comparative Examples. However, a technical scope of the present disclosure is not limited to the following Examples. In the following Examples, unless otherwise specified, an operation was performed at room temperature (25° C.). Unless otherwise specified, "%" and "parts" mean "wt %" and "parts by weight", respectively.

In a first Example (Example 1) and a first Comparative Example (Comparative Example 1), three grams (3 g) of sodium acrylate, 0.00175 g of N,N'-methylenebisacrylamide, 5 mL of water, 8 g of sodium chloride, 10 μL of tetramethylethylenediamine (TEMED) as a reaction initiator, and 10 µL of an ammonium persulfate (APS) solution (APS concentration: 20 wt %) as a reaction accelerator were mixed to prepare a mixture. The mixture was filled in a polyethylene tube (inner diameter: 3 mm, length: 200 cm), and a polymerization reaction was carried out at room temperature (25° C.) for 2 hours. The obtained polymer was dried under a reduced pressure and taken out from the tube, and unreacted substances were removed to obtain a reaction product 1.

Separately, as a priming solution, a phosphate buffer (pH 7.4) containing no visualization agent was prepared as a priming solution 1, and a commercially available Iopaque 350 injection (manufactured by Fuji Pharma Co., Ltd., iohexol content: 75.49 g/100 mL, iodine content: 35 g/100 mL) was prepared as a priming solution 2.

The reaction product 1 was cut into 1 cm, put into a two-layer tube (inner diameter: 1.3 mm, length: 5 cm) made of PTFE and nylon, 1 mL of the priming solution 1 was injected into the tube, and then the reaction product 1 was taken out to obtain a prime reaction product 1 (Comparative Example).

Next, the reaction product 1 was cut into 1 cm, put into a two-layer tube (inner diameter: 1.3 mm, length: 5 cm) made of PTFE and nylon, 1 mL of the priming solution 2 was injected into the tube, and then the reaction product 1 was taken out to obtain a prime reaction product 2 (Example). At this time, the ratio (weight ratio) of the amount of the priming solution 2 used to the amount of the reaction product 1 used was 1:250.

Next, the reaction product 1 was cut into 1 cm, put into a two-layer tube (inner diameter: 1.3 mm, length: 5 cm) made of PTFE and nylon, 1 mL of the priming solution 2 was injected into the tube, and then the reaction product 1 was taken out. The reaction product 1 was immersed in 50 mL of a phosphate buffer and left at room temperature for 24 hours for swelling to obtain a prime reaction product 3 (Example). The prime reaction product 3 is obtained by swelling the prime reaction product 2.

Each of the prime reaction products 1, 2, and 3, 1.5 mL of the priming solution 1, and 1.5 mL of the priming solution 2 was put into a microtube. The microtube was disposed in an X-ray CT apparatus (manufacturer: RF Co., Ltd., model number: NAOMI-CT), and was irradiated with X-rays under conditions of a tube voltage of 80 kV and a current of 20 mV to observe an X-ray image. In this example, the prime reaction product 2 is assumed to be in a state immediately after priming and before being indwelled in an aneurysm, and the prime reaction product 3 is assumed to be in a state 24 hours after being indwelled in the aneurysm (a state after swelling).

Figure 3:
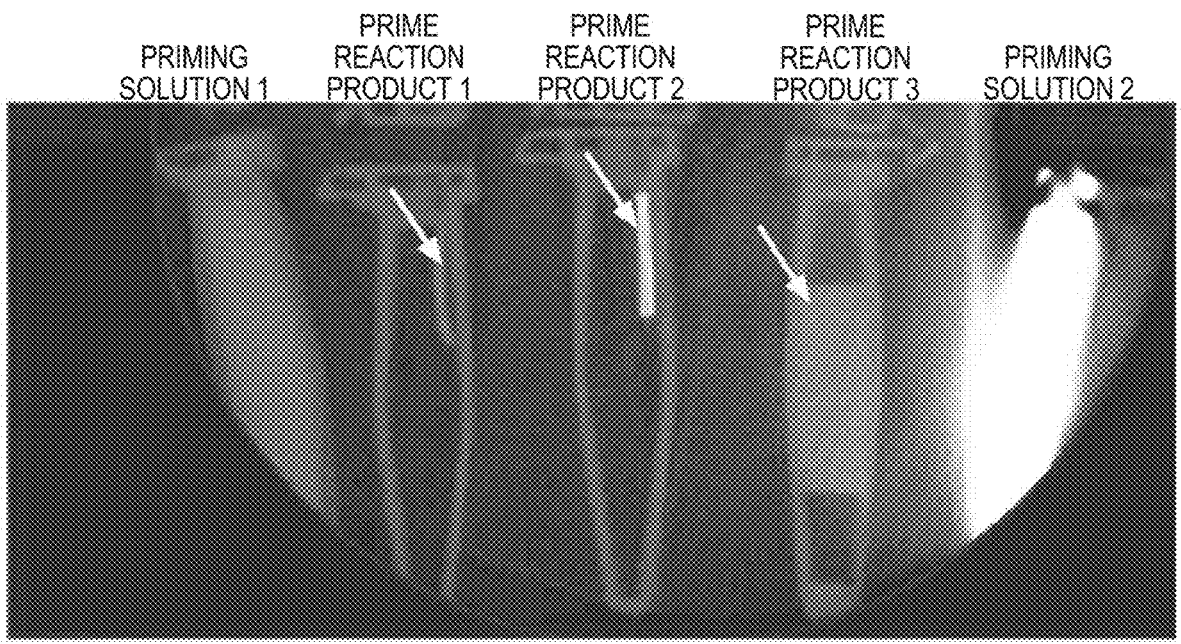
FIG. 3 is an X-ray image of prime reaction products 1 to 3, a priming solution 1, and a priming solution 2 in Example 1 according to embodiments of the present disclosure.

The result is shown in FIG. 3. In FIG. 3, X-ray images of the priming solution 1 (phosphate buffer) and the priming solution 2 (Iopaque 350 injection) are also shown for reference. As shown in FIG. 3, visibility of the prime reaction product 1 is about the same as that of the phosphate buffer, and the prime reaction product 2 can be satisfactorily visually recognized to a level close to a contrast agent. In addition, it can be seen that the prime reaction product 3 swells by immersion in the phosphate buffer, and visibility of the prime reaction product 3 is greatly reduced to a level same as that of the phosphate buffer. From this result, it is considered that, by priming a reaction product with a priming solution containing a visualization agent, sufficient visibility is exhibited before the reaction product is inserted into an aneurysm (contact with a body fluid such as blood), and the position of the embolic agent during insertion can be easily confirmed (the embolic agent has visibility that can be identified from the contrast agent).

In a second Example (Example 2) and a second Comparative Example (Comparative Example 2), three grams (3 g) of sodium acrylate, 0.00167 g of N,N'-methylenebisacrylamide, 0.375 g of poly(ethylene glycol) dimethacrylamide (molecular weight: 10,000 g/mol), 5 mL of water, 8 g of sodium chloride, 10 µL of tetramethylethylenediamine (TEMED) as a reaction initiator, and 10 µL of an ammonium persulfate (APS) solution (APS concentration: 20 wt %) as a reaction accelerator were mixed to prepare a mixture. The mixture was filled in a polyethylene tube (inner diameter: 3 mm, length: 200 cm), and a polymerization reaction was carried out at room temperature (25° C.) for 2 hours. The obtained polymer was dried under a reduced pressure and taken out from the tube, and unreacted substances were removed to obtain a reaction product 2.

Separately, as a priming solution, a phosphate buffer (pH 7.4) containing no visualization agent was prepared as a priming solution 1, and a commercially available Iopaque 350 injection (manufactured by Fuji Pharma Co., Ltd., iohexol content: 75.49 g/100 mL, iodine content: 35 g/100 mL) was prepared as a priming solution 2.

The reaction product 2 was cut into 1 cm, put into a two-layer tube (inner diameter: 1.3 mm, length: 5 cm) made of PTFE and nylon, 1 mL of the priming solution 1 was injected into the tube, and then the reaction product 2 was taken out to obtain a prime reaction product 4 (Comparative Example).

Next, the reaction product 2 was cut into 1 cm, put into a two-layer tube (inner diameter: 1.3 mm, length: 5 cm) made of PTFE and nylon, 1 mL of the priming solution 2 was injected into the tube, and then the reaction product 2 was taken out to obtain a prime reaction product 5 (Example). At this time, the ratio (weight ratio) of the amount of the priming solution 2 used to the amount of the reaction product 2 used was 1:125.

Next, the reaction product 2 was cut into 1 cm, put into a two-layer tube (inner diameter: 1.3 mm, length: 5 cm) made of PTFE and nylon, 1 mL of the priming solution 2 was injected into the tube, and then the reaction product 2 was taken out. The reaction product 2 was immersed in 50 mL of a phosphate buffer and left at room temperature for 24 hours for swelling to obtain a prime reaction product 6 (Example). The prime reaction product 6 is obtained by swelling the prime reaction product 5.

Each of the prime reaction products 4, 5, and 6, 1.5 mL of the priming solution 1 (phosphate buffer), and 1.5 mL of the priming solution 2 was put into a microtube. The microtube was disposed in an X-ray CT apparatus (manufacturer: RF Co., Ltd., model number: NAOMI-CT), and was irradiated with X-rays under conditions of a tube voltage of 80 kV and a current of 20 mV to observe an X-ray image. In this example, the prime reaction product 5 is assumed to be in a state immediately after priming and before being indwelled in an aneurysm, and the prime reaction product 6 is assumed to be in a state 24 hours after being indwelled in the aneurysm (a state after swelling).

Figure 4:
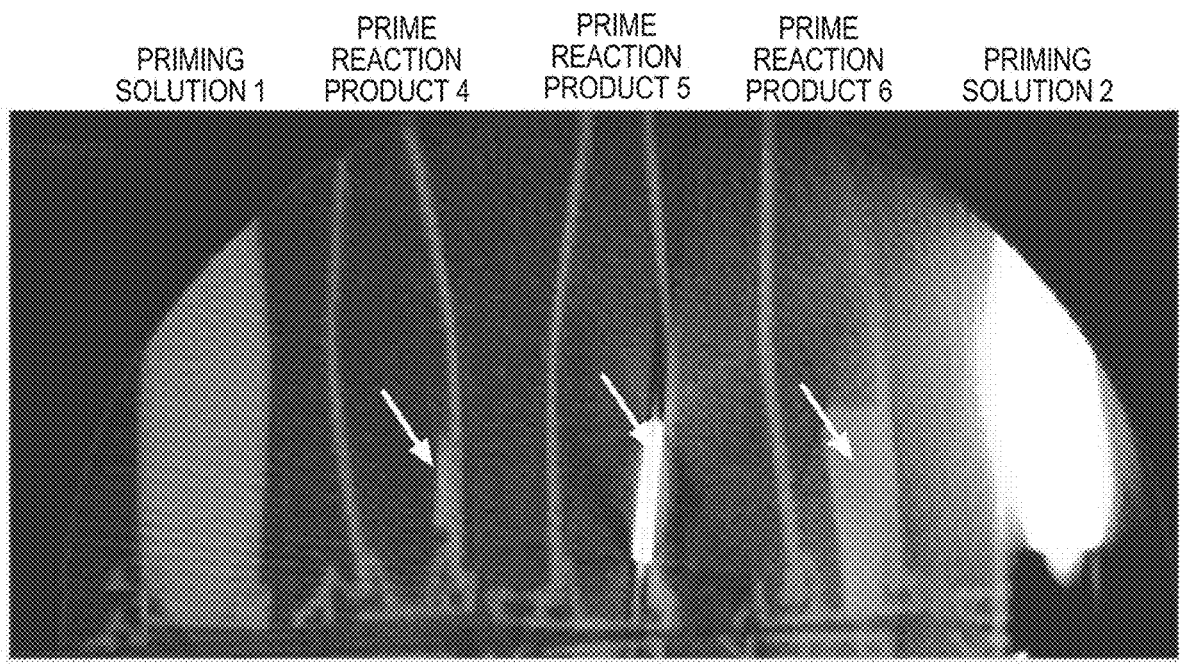
FIG. 4 is an X-ray image of prime reaction products 4 to 6, a priming solution 1, and a priming solution 2 in Example 2 according to embodiments of the present disclosure.

The result is shown in FIG. 4. In FIG. 4, X-ray images of the priming solution 1 (phosphate buffer) and the priming solution 2 (Iopaque 350 injection) are also shown for reference. As shown in FIG. 4, visibility of the prime reaction product 4 is about the same as that of the phosphate buffer, visibility of the prime reaction product 5 is higher than that of the prime reaction product 2, and the prime reaction product 5 can be satisfactorily visually recognized to a level same as that of a contrast agent. In addition, it can be seen that the prime reaction product 6 swells by immersion in the phosphate buffer, and visibility of the prime reaction product 6 is greatly reduced to a level same as that of the phosphate buffer. From this result, it is considered that, by priming a reaction product with a priming solution containing a visualization agent, sufficient visibility is exhibited before the reaction product is inserted into an aneurysm (contact with a body fluid such as blood), and the position of the embolic agent during insertion can be easily confirmed (the embolic agent has visibility that can be identified from the contrast agent).

In addition, when the prime reaction product 2 in FIG. 3 is compared with the prime reaction product 5 in FIG. 4, the prime reaction product 5 exhibits higher visibility. It is presumed that this result is obtained because the presence of a bifunctional macromer (poly(ethylene glycol) dimethacrylamide) increases hydrophilicity of the reaction product, and a larger amount of the visualization agent (iohexol) is incorporated into the reaction product by immersion into the priming solution.

What is claimed is:

1. An embolic agent kit, comprising:
   a catheter having an inner cavity;
   a reaction product of an ethylenically unsaturated monomer and a crosslinking agent, the reaction product filled in the inner cavity; and
   a priming solution containing a visualization agent and configured to prime an inside of the catheter.

2. The embolic agent kit of claim 1, wherein a bifunctional macromer is used to form the reaction product.

3. The embolic agent kit of claim 2, wherein the bifunctional macromer is at least one selected from the group consisting of polyethylene glycol, polypropylene glycol, poly(tetramethylene oxide), poly(ethylene glycol) diacrylamide, poly(ethylene glycol) dimethacrylamide, poly(ethylene glycol) diacrylate, poly(ethylene glycol) dimethacrylate, and derivatives thereof.

4. The embolic agent kit of claim 3, wherein the ethylenically unsaturated monomer is at least one selected from the group consisting of N-vinylpyrrolidinone, 2-hydroxyethyl acrylate, 2-hydroxyethyl methacrylate, and derivatives thereof, and acrylic acid, methacrylic acid, and salts thereof.

5. The embolic agent kit of claim 4, wherein the visualization agent is nonionic in the priming solution.

6. The embolic agent kit of claim 1, wherein the ethylenically unsaturated monomer has an ionic functional group, and wherein the visualization agent forms in the priming solution a counter ion for the ionic functional group of the ethylenically unsaturated monomer.

7. The embolic agent kit of claim 1, wherein the crosslinking agent is at least one selected from the group consisting of N,N'-methylenebisacrylamide, ethylene glycol dimethacrylate, and derivatives thereof.

8. The embolic agent kit of claim 1, wherein the reaction product is used to treat an aneurysm of a patient, and wherein treating the aneurysm includes:
   preparing a filled catheter in which the reaction product is filled in the inner cavity of the catheter;
   introducing a gel insertion catheter into the aneurysm;
   introducing a graft into the aneurysm;
   priming the inner cavity of the filled catheter with the priming solution to obtain a prime reaction product;
   inserting the filled catheter primed with the priming solution into the gel insertion catheter;
   inserting an extrusion pusher into the inner cavity of the filled catheter and an inner cavity of the gel insertion catheter; and
   extruding the prime reaction product into a space formed between an outer surface of the graft and an inner surface of the aneurysm.

9. The embolic agent kit of claim 8, wherein a delivery pusher is inserted into the inner cavity of the filled catheter.

10. A treatment system, comprising:
    an embolic agent kit, comprising:
       a catheter having an inner cavity;
       a reaction product of an ethylenically unsaturated monomer and a crosslinking agent, the reaction product filled in the inner cavity; and
       a priming solution containing a visualization agent and configured to prime an inside of the catheter; and
    a graft.

11. The treatment system of claim 10, wherein the embolic agent kit is used to treat an aneurysm of a patient, and wherein treating the aneurysm includes:
    preparing a gel-filled catheter in which the reaction product is filled in the inner cavity of the catheter,
    introducing a gel insertion catheter into the aneurysm;
    introducing the graft into the aneurysm;
    priming the inner cavity of the gel-filled catheter with the priming solution to obtain a prime reaction product;
    inserting the gel-filled catheter primed with the priming solution into the gel insertion catheter;
    inserting an elongated extrusion pusher into the inner cavity of the gel-filled catheter, and extruding the prime reaction product into an inner cavity of the gel insertion catheter by the extrusion pusher; and
    inserting an elongated delivery pusher into the inner cavity of the gel insertion catheter, and extruding, by the delivery pusher, the prime reaction product in the inner cavity of the gel insertion catheter into a space formed between an outer surface of the graft and an inner surface of the aneurysm.

12. The treatment system according to claim 10, wherein the embolic agent kit is used to treat an aneurysm of a patient, and wherein treating the aneurysm includes:
    preparing a gel-filled catheter in which the reaction product is filled in the inner cavity of the catheter;
    introducing a gel insertion catheter into the aneurysm;
    introducing the graft into the aneurysm;
    priming the inner cavity of the gel-filled catheter with the priming solution to obtain a prime reaction product;
    inserting the gel-filled catheter primed with the priming solution into an inner cavity of the gel insertion catheter;
    inserting an elongated extrusion pusher into the inner cavity of the gel-filled catheter primed with the priming solution; and
    extruding, by the extrusion pusher, the prime reaction product into a space formed between an outer surface of the graft and an inner surface of the aneurysm via the gel insertion catheter.

13. The treatment system of claim 10, wherein a bifunctional macromer is used to form the reaction product.

14. The treatment system of claim 13, wherein the bifunctional macromer is at least one selected from the group consisting of polyethylene glycol, polypropylene glycol, poly(tetramethylene oxide), poly(ethylene glycol) diacrylamide, poly(ethylene glycol) dimethacrylamide, poly(ethylene glycol) diacrylate, poly(ethylene glycol) dimethacrylate, and derivatives thereof.

15. The treatment system of claim 14, wherein the ethylenically unsaturated monomer is at least one selected from the group consisting of N-vinylpyrrolidinone, 2-hydroxyethyl acrylate, 2-hydroxyethyl methacrylate, and derivatives thereof, and acrylic acid, methacrylic acid, and salts thereof.

16. The treatment system of claim 15, wherein the visualization agent is nonionic in the priming solution.

17. The treatment system of claim 10, wherein the ethylenically unsaturated monomer has an ionic functional group, and wherein the visualization agent forms in the priming solution a counter ion for the ionic functional group of the ethylenically unsaturated monomer.

18. The treatment system of claim 10, wherein the crosslinking agent is at least one selected from the group consisting of N,N'-methylenebisacrylamide, ethylene glycol dimethacrylate, and derivatives thereof.

19. A method for preparing an embolic agent, comprising:
impregnating a reaction product of a bifunctional macromer, an ethylenically unsaturated monomer, and a crosslinking agent with a priming solution containing a visualization agent.

20. The method of claim 19, wherein the bifunctional macromer is at least one selected from the group consisting of polyethylene glycol, polypropylene glycol, poly(tetramethylene oxide), poly(ethylene glycol) diacrylamide, poly(ethylene glycol) dimethacrylamide, poly(ethylene glycol) diacrylate, poly(ethylene glycol) dimethacrylate, and derivatives thereof.

* * * * *